(12) United States Patent
Wendeler-Goeggelmann

(10) Patent No.: US 11,975,381 B2
(45) Date of Patent: May 7, 2024

(54) WIRE NETTING SYSTEM

(71) Applicant: Geobrugg AG, Romanshorn (CH)

(72) Inventor: Corinna Wendeler-Goeggelmann, Herisau (CH)

(73) Assignee: Geobrugg AG, Romanshorn (CH)

( * ) Notice: Subject to any disclaimer, the term of this patent is extended or adjusted under 35 U.S.C. 154(b) by 1074 days.

(21) Appl. No.: 16/651,463

(22) PCT Filed: Oct. 9, 2018

(86) PCT No.: PCT/EP2018/077473
§ 371 (c)(1),
(2) Date: Mar. 27, 2020

(87) PCT Pub. No.: WO2019/072846
PCT Pub. Date: Apr. 18, 2019

(65) Prior Publication Data
US 2020/0267953 A1  Aug. 27, 2020

(30) Foreign Application Priority Data

Oct. 12, 2017  (DE) .................. 10 2017 123 817.4

(51) Int. Cl.
*B21F 27/00* (2006.01)
*E04B 2/86* (2006.01)
(Continued)

(52) U.S. Cl.
CPC ............ *B21F 27/00* (2013.01); *E04B 2/8658* (2013.01); *E04H 17/05* (2021.01); *G01N 17/00* (2013.01); *G01N 17/02* (2013.01)

(58) Field of Classification Search
CPC ........... B21F 27/00; B21F 27/02; C09D 5/106
See application file for complete search history.

(56) References Cited

U.S. PATENT DOCUMENTS 2,814,466 A * 11/1957 Golobay ................. E04H 17/10
256/32
3,682,419 A * 8/1972 Vanderfaeillie ....... B21F 27/005
251/315.16
(Continued)

FOREIGN PATENT DOCUMENTS

AU  200189383 B2  6/2005
CA  2752023 A1  4/2012
(Continued)

OTHER PUBLICATIONS

New Zealand Examination Report dated Feb. 3, 2023 in corresponding NZ Application No. 763792.
(Continued)

*Primary Examiner* — Heather Mangine
(74) *Attorney, Agent, or Firm* — POSZ LAW GROUP, PLC

(57) ABSTRACT

A wire netting device, in particular safety net device, includes at least two mutually engaging net elements, at least one net element of which is produced from at least one single wire, a wire bundle, a wire strand, a wire rope and/or another longitudinal element with at least one wire that is made at least partially of a high-tensile steel, the wire comprises at least one corrosion protection, in particular a corrosion protection layer and a portion of the wire (12a-g), in particular at least a portion of a wire mesh implemented of the wire, with the corrosion protection, in particular the corrosion protection layer, in a test run by an alternating climate test has a corrosion resistance of more than 1,680 hours, preferably more than 2,016 hours, advantageously more than 2,520 hours, preferentially more than 3,024 hours and particularly preferably more than 3,528 hours.

4 Claims, 11 Drawing Sheets

Figure 1:
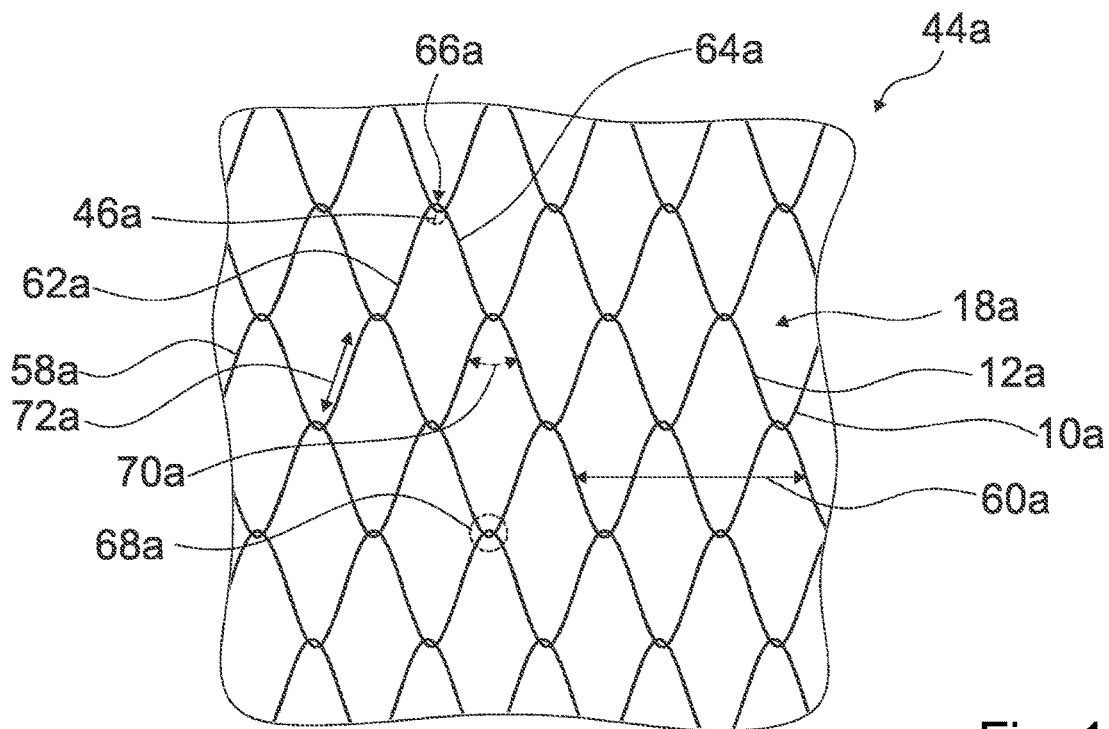

(51) Int. Cl.

| | |
|---|---|
| *E04H 17/04* | (2006.01) |
| *G01N 17/00* | (2006.01) |
| *G01N 17/02* | (2006.01) |

(56) References Cited

U.S. PATENT DOCUMENTS

| | | | | |
|---|---|---|---|---|
| 6,279,858 | B1* | 8/2001 | Eicher | B21D 11/07 |
| | | | | 256/33 |
| 9,695,322 | B2* | 7/2017 | Gros | C09D 5/086 |
| 9,982,142 | B2* | 5/2018 | Liu | C09D 163/00 |
| 2002/0005223 | A1* | 1/2002 | Campagna | F16L 58/08 |
| | | | | 138/146 |
| 2008/0010784 | A1 | 1/2008 | Flum | |
| 2011/0265729 | A1* | 11/2011 | Atz | A01K 75/00 |
| | | | | 72/146 |
| 2012/0241565 | A1* | 9/2012 | Wartmann | B21F 27/02 |
| | | | | 245/5 |
| 2014/0120370 | A1* | 5/2014 | Warichet | C23C 2/36 |
| | | | | 427/310 |
| 2016/0032110 | A1* | 2/2016 | Battaglia | C09D 183/06 |
| | | | | 524/55 |
| 2018/0214929 | A1* | 8/2018 | Wendeler-Goeggelmann | |
| | | | | B21F 27/02 |
| 2018/0216266 | A1* | 8/2018 | Wendeler-Goeggelmann | |
| | | | | E01F 7/04 |
| 2018/0305802 | A1* | 10/2018 | Sakamoto | B32B 15/043 |
| 2019/0321877 | A1* | 10/2019 | Wendeler-Goeggelmann | |
| | | | | E01F 7/04 |
| 2019/0330810 | A1* | 10/2019 | Wendeler-Goeggelmann | |
| | | | | E01F 7/045 |
| 2019/0344328 | A1* | 11/2019 | Wendeler-Goeggelmann | |
| | | | | E01F 7/04 |
| 2019/0345680 | A1* | 11/2019 | Wendeler-Goeggelmann | |
| | | | | E02D 17/202 |
| 2019/0381558 | A1* | 12/2019 | Wendeler-Goeggelmann | |
| | | | | B21F 27/04 |
| 2020/0232904 | A1* | 7/2020 | Wendeler-Goeggelmann | |
| | | | | G01N 17/04 |
| 2020/0267953 | A1* | 8/2020 | Wendeler-Goeggelmann | |
| | | | | G01N 17/02 |
| 2020/0308785 | A1* | 10/2020 | Sennhauser | E01F 7/04 |

FOREIGN PATENT DOCUMENTS

| | | |
|---|---|---|
| CH | 699799 A2 | 4/2010 |
| CH | 703929 A2 | 4/2012 |
| CN | 201747116 U | 2/2011 |
| CN | 202614653 U | 12/2012 |
| CN | 103361588 A | 10/2013 |
| CN | 103375658 A | 10/2013 |
| CN | 103507324 A | 1/2014 |
| CN | 205712139 U | 11/2016 |
| CN | 106290122 A | 1/2017 |
| CN | 106366928 A | 2/2017 |
| DE | 2856819 A1 | 7/1980 |
| DE | 3828911 C1 | 2/1989 |
| DE | 20300821 U1 | 4/2003 |
| DE | 202006004462 U1 | 10/2006 |
| DE | 102006012916 A1 | 9/2007 |
| DE | 202014100098 U1 | 2/2014 |
| DE | 102015007412 A1 | 8/2015 |
| EP | 1862261 A2 | 6/2007 |
| EP | 2584067 A1 | 4/2013 |
| EP | 1983068 B1 | 6/2014 |
| FR | 1241091 A | 9/1960 |
| GB | 1440328 A | 6/1976 |
| GB | 1517454 A | 7/1978 |
| JP | H11101026 A | 4/1999 |
| JP | 2004279347 A | 10/2004 |
| JP | 2008-501878 A | 1/2008 |
| RU | 2333327 C1 | 2/2007 |
| WO | 91/013425 A1 | 9/1991 |
| WO | 99/43894 A1 | 9/1999 |
| WO | 2008/132654 A1 | 11/2008 |
| WO | 2015/128177 A1 | 9/2015 |
| WO | 2017/060745 A1 | 4/2017 |

OTHER PUBLICATIONS

Colombian Examination Report dated Mar. 16, 2023 in corresponding CO Application No. NC2020/0004096 (and English machine translation).
Colombian Office Action dated Apr. 8, 2022 issued in corresponding New Caledonia Patent Application No. NC2020/0004096 (and English translation).
Colombian Office Action dated Oct. 24, 2022 in corresponding Colombian Patent Application No. NC2020/0004096 (and English machine translation).
Chinese Office Action dated Oct. 31, 2022 in corresponding Chinese Patent Application No. CN 201880066580.0 (and English machine translation).
Chilean Office Action dated Jul. 6, 2021, issued in corresponding CL Patent Application No. 202000967 (and English Machine Translation).
Office Action dated Oct. 12, 2021, issued in corresponding JP Patent Application No. 2020-520564(and English Machine Translation).
Office Action dated Jun. 19, 2023 issued in corresponding European Patent Application No. 18785916.0 (and English machine translation).
Office Action dated Jul. 14, 2023 issued in corresponding Australian Patent Application No. 2018348700.
Search Report dated Oct. 15, 2018 issued in corresponding DE patent application No. 10 2017 123 817.4 (and partial English translation).
International Search Report dated Mar. 8, 2019 issued in corresponding International Patent Application No. PCT/EP2018/077473.
International Preliminary Report on Patentability dated Jan. 30, 2020 issued in corresponding International Patent Application No. PCT/EP2018/077473.
ArcelorMittal "Steels with galfan zinc-aluminum coating", https://industry.arcelormittal.com/catalogue/E30EN, (Stand Sep. 19, 2017).
Tong Wu et al., "Single layer graphitic carbon nitride-modified graphene composite as a fiber coating for solid-phase microextraction of polycyclic aromatic hydrocarbons" Microchim Acta (2017) Springer Verlag, vol. 184, No. 7, pp. 2171-2180, DOI 10.1007/s00604-017-2233-0, Published online: Apr. 5, 2017, Department of Chemistry, College of Science Hebei Agricultural University, Baoding, Hebei 071001, China.
Salgueiro Azevedo et al., Abstract and Drawing for "Corrosion mechanisms of Zn(Mg,Al) coated steel in accelerated tests and natural exposure:1. The role of electrolyte composition in the nature of corrosion products and relative corrosion rate", Corrosion Science, vol. 90, Jan. 2015.
Office Action dated Jul. 22, 2019 issued in corresponding TW patent application No. 107135877( and English translation).
Examination Report dated Jun. 7, 2021, issued in corresponding EP Patent Application No. 18785916.0 (and English Machine Translation).
Examination Report dated May 18, 2021, issued in corresponding JP Patent Application No. 2020-520564 (and English Machine Translation).
Deflorian et al., "Corrosion behaviour of steel ropes for snow and rockfall barriers," Corrosion, Engineering, Science, and Technology, 2004, 5 pages, vol. 39.
Examination Report dated Apr. 28, 2021, issued in corresponding KR Patent Application No. 10 2020 7011995 (and English Machine Translation).
First Examination Report dated Apr. 18, 2022 in connection with corresponding Indian Patent Application No. 202017017425.
First Examination Report dated Feb. 11, 2022 in connection with corresponding Russian Patent Application No. 2020 114 884 (with machine translation).
Office Action dated Jul. 16, 2020 issued in corresponding TW patent application No. 107135877 (English translation only).

(56) References Cited

OTHER PUBLICATIONS

"Corrosion Test Cabinet for VDA 233-102," pp. 1-4 (and English machine translation).
"DIN 2078 Standard," Beuth Verlag Publishing, Mar. 1978, pp. 1-5 (English translation only).
"DIN EN 10264-2 D Standard," Beuth Verlag Publishing, Mar. 2012, pp. 1-10 (and English machine translation).

* cited by examiner

WIRE NETTING SYSTEM

CROSS REFERENCE TO RELATED APPLICATIONS

This application is a U.S. national stage application of PCT/EP2018/077473 filed on Oct. 9, 2018, which is based on German Patent Application No. 10 2017 123 817.4 filed on Oct. 12, 2017, the contents of which are incorporated herein by reference.

STATE OF THE ART

The invention concerns in particular a wire netting device, a method for identifying a suitable wire, methods for a production of a wire netting device, and a test device for a testing of a corrosion resistance of at least one test piece of a wire of a wire netting device.

A wire of a wire netting device comprising a corrosion protection coating has already been proposed.

The objective of the invention is in particular to provide a generic device having a high degree of resistance.

Advantages of the Invention

The invention is based on a wire netting device, in particular a safety net device, with at least two mutually engaging net elements, at least one net element of which is produced from at least one single wire, a wire bundle, a wire strand, a wire rope and/or another longitudinal element with at least one wire that is made at least partially, preferably apart from coatings entirely, of a high-tensile steel, wherein the wire comprises at least one corrosion protection, in particular a corrosion protection layer.

It is proposed that at least a portion of the wire, in particular at least a portion of a wire mesh implemented of the wire, with the corrosion protection, in particular the corrosion protection layer, in a test run by an alternating climate test has a corrosion resistance of more than 1,680 hours, preferably more than 2,016 hours, advantageously more than 2,520 hours, preferentially more than 3,024 hours and particularly preferably more than 3,528 hours. This advantageously allows achieving a high resistance of the wire, in particular of the wire netting device and/or of a wire net, preferably a safety net, in particular with respect to corrosive environmental conditions, e.g. weather conditions. Advantageously it is herewith possible to achieve a long lifetime of the wire, in particular of the wire netting device and/or of the wire net, as a result of which in particular maintenance and/or upkeep costs can be reduced. Moreover an increased reliability and/or safety of the wire netting device and/or of the wire net may advantageously be facilitated.

A "wire netting device" preferably comprises at least a portion of a netting, in particular a wire netting. A "net element" is in particular to mean a basic element of the wire netting device, in particular of the wire net, preferably the safety net, which can in particular be singulated and which forms the wire net by way of a mutual engaging with neighboring basic elements. The net element is in particular embodied as a filament-like form, in particular wire form, for example of at least one single wire, at least one wire bundle, at least one wire strand and/or at least one wire rope. The filament-like form, in particular wire form, may in particular have two open ends or may be closed in itself. Preferably the filament-like form, in particular wire form, is situated, in a non-loaded state, at least substantially in a plane. The net element may in particular have an irregular shape or preferably a regular shape constituting at least partly a shape of a circle, of a rhombus and/or of a regular and/or irregular polygon. In particular different net elements of the safety net may have different shapes; however the net elements preferably have an at least substantially identical shape. Preferentially the net element is implemented as a helix, in particular a flat-pressed helix, or as a ring, in particular a wire ring. In particular, the net element at least partially forms a net member of a ring net or a helix of a mesh net. Preferably "at least substantially identical" is to mean identical except for manufacturing tolerances and/or in the range of manufacture-relied possibilities.

By a "wire" is in particular, in this context, a body to be understood that is elongate and/or thin and/or at least machine-wise bendable and/or flexible. Advantageously the wire has along its longitudinal direction an at least substantially constant, in particular circle-shaped or elliptic, cross section. Especially advantageously the wire is implemented as a round wire. It is however also conceivable that the wire is implemented, at least section-wise or entirely, as a flat wire, a rectangular wire, a polygonal wire and/or a profile wire. The wire may, for example, be implemented at least partly or entirely of metal, in particular a metal alloy, and/or of an organic and/or inorganic synthetic material and/or of a composite material and/or of an inorganic non-metallic material and/or of a ceramic material. The wire may in particular be implemented at least partly as a composite wire, e.g. as a metal-organic composite wire and/or a metal-inorganic composite wire and/or a metal-polymer composite wire and/or a metal-metal composite wire or the like. In particular it is conceivable that the wire comprises at least two different materials, which are in particular arranged relative to one another following a composite geometry and/or are at least partially mixed with one another. Advantageously the wire is embodied as a metal wire, in particular as a steel wire, in particular a stainless steel wire. Advantageously the wire, in particular the wire bundle, the wire strand, the wire rope and/or the other longitudinal element comprising the at least one wire are/is manufactured at least partly, in particular apart from a coating entirely, of a high-tensile steel. Preferably the wire is a high-tensile steel wire. The high-tensile steel may, for example, be a spring steel and/or wire steel and/or a steel suitable for wire ropes. In particular the wire has a tensile strength of at least 800 N $mm^{-2}$, advantageously at least 1000 N $mm^{-2}$, especially advantageously at least 1200 N $mm^{-2}$, preferably at least 1400 N $mm^{-2}$ and particularly preferably at least 1600 N $mm^{-2}$, in particular a tensile strength of approximately 1770 N $mm^{-2}$ or approximately 1960 N $mm^{-2}$. It is also conceivable that the wire has an even higher tensile strength, e.g. a tensile strength of at least 2000 N $mm^{-2}$, or at least 2200 N $mm^{-2}$, or possibly no less than 2400 N $mm^{-2}$. In this way it is possible to achieve a high load capacity, in particular a high tensile strength and/or a high degree of rigidity transversely to the wire net. Moreover advantageous bendability characteristics are achievable. In particular the wire, preferably a plurality of wires, is configured to at least partly form a wire mesh, which is in particular realized of net elements, preferably of helices and/or rings. "Configured" is in particular to mean specifically programmed, designed and/or equipped. By an object being configured for a certain function is in particular to be understood that the object fulfills and/or executes said certain function in at least one application state and/or operation state.

A "corrosion protection" is in particular to mean a protection, in particular a protection measure, to avoid damages that may occur due to corrosion in structural elements, in particular metallic structural elements. The corrosion protection may in particular comprise an active cathodic corrosion protection and/or a passive corrosion protection. A passive corrosion protection is in particular achievable by means of a corrosion protection layer, preferably a corrosion protection coating. By a "portion of the wire" is in particular a piece of the wire forming the wire netting device, in particular the wire mesh, which has preferably a length of at least 1 cm, preferentially at least 3 cm or particularly preferably at least 5 cm. A "portion of a wire mesh that is formed of the wire" is in particular to mean a wire mesh with at least one bending region, preferably with at least two bending regions and preferentially with at least five bending regions and/or with at least one net element, preferably a helix and/or ring, preferentially with at least two net elements, preferentially helices and/or rings, which are in particular braided with one another, preferably with at least five net elements, preferentially helices and/or rings, which are in particular braided with one another. By a "bending region" is in particular a region of a wire to be understood in which a wire orientation changes by at least 30°, preferably at least 45°, preferentially at least 60°, in particular within a wire length that is smaller than three wire diameters, preferably smaller than five wire diameters and preferably smaller than ten wire diameters.

An "alternating climate test" is in particular to mean a corrosion resistance test of the corrosion protection, in particular of the corrosion protection layer, preferably following the specifications given by VDA [German Association of the Automotive Industry] in their Recommendation VDA 233-102, which in particular provides, at least in a partial period, a fogging and/or spraying of at least one test piece with a salt spray fog and/or exposing the test piece, at least in a sub-period, to a temperature change from room temperature to sub-zero temperatures. By varying a temperature, a relative humidity and/or a salt concentration which the test piece is exposed to, it is advantageously possible to improve a reliability of a test method. In particular test conditions can be adapted closer to real conditions which the wire netting device is exposed to, in particular when used in the field. The test piece is preferably embodied as a portion of a wire that is at least substantially identical to the wire of the wire netting device, preferentially as a portion of the wire of the wire netting device. The alternating climate test is preferably carried out in accordance with the customary edge conditions for alternating climate tests, which are known to anyone skilled in the art and which are in particular listed in VDA Recommendation 233-102 of Jun. 30, 2013. The alternating climate test is in particular carried out in a test chamber. The conditions in an interior of the test chamber during the alternating climate test are in particular strictly controlled conditions. In particular, strict specifications regarding temperature profiles, relative air humidity and periods of fogging with salt spray fog must be followed in the alternating climate test. A test cycle of the alternating climate test is in particular divided into seven cycle sections. A test cycle of the alternating climate test in particular takes one week. One cycle section in particular takes one day. A test cycle comprises three different test sub-cycles. A test sub-cycle implements a cycle section. The three test sub-cycles comprise at least one cycle A, at least one cycle B and/or at least one cycle C. During a test cycle, test sub-cycles are realized one by one in the following order: cycle B, cycle A, cycle C, cycle A, cycle B, cycle B, cycle A.

Cycle A in particular comprises a salt spray phase. In the salt spray phase a salt spray fog is sprayed in particular within the test chamber. In particular the salt solution sprayed during cycle A is here in particular realized as a solution of sodium chloride in distilled water, which has preferably been boiled prior to a preparation of the solution and which preferentially has an electrical conductivity of maximally 20 µS/cm at $(25\pm2)°$ C., with a mass concentration in a range of $(10\pm1)$ g/l. The test chamber for the alternating climate test in particular has an inner volume of at least 0.4 $m^3$. In particular in an operation of the test chamber the inner volume is homogeneously filled with a salt spray fog. The upper portions of the test chamber are preferably implemented in such a way that drops occurring on the surface cannot fall onto a test piece. Advantageously a temperature is $(35\pm0.5)°$ C. during a spraying of the salt spray fog, in particular within the test chamber, wherein the temperature is preferably measured at a distance of at least 100 mm from a wall of the test chamber.

Cycle B in particular comprises a work phase, during which the temperature is maintained at room temperature (25° C.) and the relative humidity is maintained at a room-typical relative humidity (70%). In the work phase in particular the test chamber can be opened and the test piece can be assessed and/or checked.

Cycle C in particular comprises a freezing phase. In the freezing phase in particular the test chamber temperature is maintained at a value below 0° C., preferably at −15° C.

A "corrosion resistance" is in particular to be understood as a durability of a material during a corrosion test, for example an alternating climate test, in particular in accordance with VDA recommendation 233-102 of Jun. 30, 2013, a salt spray fog test, in particular in accordance with standard DIN EN ISO 9227:2006, a sulfur dioxide test, in particular in accordance with standard DIN 50018:1997-6 and/or an exposition test, during which a functionality of a test piece is maintained, and/or preferably a time duration during which a threshold value of a corrosion parameter of a test piece is undershot during a corrosion test, for example an alternating climate test, a salt spray fog test, a sulfur dioxide test and/or an exposition test. By "a functionality being maintained" is in particular to be understood that material properties of a test piece which are relevant for a functionality of a wire netting, like a tear resistance and/or brittleness, remain substantially unchanged. By "a material property remain[ing] substantially unchanged" is in particular to be understood that a change in a material parameter and/or a material property amounts to less than 10%, preferably less than 5%, preferentially less than 3% and especially preferentially less than 1% with respect to an initial value prior to the corrosion test. Preferably the corrosion parameter is implemented as a percentage of an overall surface of a test piece, on which dark brown rust (DBR) is, in particular visually, perceivable. The threshold value of the corrosion parameter is preferably 5%. A corrosion resistance thus preferably indicates a time interval which passes until dark brown rust (DBR) is visually perceivable on 5% of an overall surface of a test piece, in particular an overall surface of a test piece that is exposed to the salt spray fog in the alternating climate test and/or in the salt spray fog test. Preferentially the corrosion resistance is the time that passes between a start of the alternating climate test, the salt spray fogging test, the sulfur dioxide test and/or the exposition test and an occurrence of 5% DBR on the surface of the test piece.

In a further aspect of the invention, which may be considered on its own or in a combination with at least one aspect, in particular in a combination with one aspect, in particular in a combination with any number of the remaining aspects of the invention, at least a portion of the wire, in particular at least a portion of a wire mesh implemented of the wire, with the corrosion protection, in particular the corrosion protection layer, in a test run by an alternating climate test has a corrosion resistance that is higher than a corrosion resistance of a further wire, having a same circumference, in particular a same cross section and/or preferably a same diameter, as the wire, and having a zinc coating, said zinc coating having a mass per unit area of the zinc coating that is at least 115 g/m², preferably at least 150 g/m², advantageously at least 200 g/m², and preferably maximally 215 g/m², in particular at least of a portion of a wire netting implemented of a further wire, said further wire having a same circumference, in particular a same diameter and/or preferably a same cross section aw well as a zinc coating, the zinc coating having a mass per unit area that is at least 115 g/m², preferably at least 150 g/m², advantageously at least 200 g/m², and preferably maximally 215 g/m². In this way advantageously a high resistance of the wire, in particular of the wire netting device and/or of a wire net, preferably a safety net, is achievable, in particular with respect to corrosive environment conditions, for example weather conditions. Advantageously herewith a long lifetime of the wire, in particular of the wire netting device and/or the wire net, is achievable, as a result of which it is in particular possible to reduce maintenance and/or upkeep costs. Moreover an increased reliability and/or safety of the wire netting device and/or of the wire netting is advantageously facilitable. By a "corrosion resistance that is higher" is in particular a corrosion resistance to be understood that is higher by at least 5%, preferably higher by at least 15%, advantageously higher by at least 25%, preferentially higher by at least 50% and particularly preferably higher by at least 100%.

It is moreover proposed that at least a portion of the wire, in particular at least a portion of a wire netting that is implemented of the wire, with the corrosion protection, in particular the corrosion protection layer, in a test run by a salt spray fog test has a corrosion resistance of more than 500 hours, preferably more than 600 hours, advantageously more than 700 hours, preferentially more than 800 hours and especially preferentially more than 1,000 hours. This advantageously allows achieving a high resistance of the wire, in particular of the wire netting device and/or of a wire net, preferably a safety net, in particular with respect to corrosive environment conditions, e.g. weather conditions. Advantageously herewith a long lifetime of the wire, in particular the wire netting device and/or the wire net, is achievable, as a result of which it is in particular possible to reduce maintenance and/or upkeep costs. Moreover an increased reliability and/or safety of the wire netting device and/or of the wire netting may advantageously be made possible. Beyond this it is advantageously possible to use the wire netting device and/or the wire netting in sites having highly corrosive environment conditions, for example in environments with a high salt content of the air, like places close to a coast, while maintaining sufficient lifetime and/or economic feasibility.

A "salt spray fog test" is in particular to be understood as a test for an evaluation of a corrosion protection effect of a corrosion protection, in particular of a corrosion protection layer. In particular, in the salt spray fog test a test piece undergoes in a test chamber a spraying with a sprayed salt solution, preferably a sodium chloride solution, which in particular applies a corrosive effect to the test piece. The test piece is preferably embodied as a portion of a wire, preferably a portion of the wire of the wire netting device, that is at least substantially identical to the wire of the wire netting device. The salt spray fog test is preferably carried out in accordance with the customary edge conditions, known to someone skilled in the art, for salt spray fog tests, which are in particular given in the standard DIN EN ISO 9227:2006. The salt solution sprayed in the salt spray fog test is herein in particular implemented of a solution of sodium chloride in distilled water, which was in particular boiled prior to making the solution and which preferably has an electrical conductivity of maximally 20 µS/cm at (25±2)° C., with a mass concentration in a range of (50±5) g/l. The salt solution sprayed in the salt spray fog test furthermore in particular comprises a maximum mass fraction of copper and nickel of 0.001% and a maximum mass fraction of sodium iodide of 0.1% and a maximum mass fraction of overall contaminations of 0.5%. A pH value of the salt solution sprayed in the salt spray fog test is preferably in a range between 6.5 and 7.2, measured at (25±2)° C. The test chamber for the salt spray fog test in particular has an inner volume of at least 0.4 m³. In particular during operation of the test chamber, the inner volume is homogeneously filled with salt spray fog. The upper portions of the test chamber are preferably implemented in such a way that no drops occurring on the surface can fall onto a test piece. Advantageously in the salt spray fog test a temperature, in particular inside the test chamber, is (35±2)° C., with the temperature being measured preferably at a distance of at least 100 mm from a wall of the test chamber. In the salt spray fog test a salt spray fog is generated in the interior of the test chamber in particular by means of at least one nozzle, and herein a pressure of a pressurized air is between 70 kPa and 140 kPa, said pressurized air being preferably humidified with water at a temperature in a range between 45° C. and 52° Cs, prior to a spraying of the salt spray fog. For carrying out the salt spray fog test, the test piece is preferably to be held in a holding unit, if possible contact-free, wherein in particular cut edges must be protected by a coating material, e.g. an adhesive tape or wax. The holding unit is preferably implemented of non-metallic materials, preferably electrically insulating materials. The test piece is, in particular in a run of the salt spray fog test, free of a direct spraying by a spray beam of the nozzle. In a run of the salt spray fog test, the test piece is in particular held in the holding unit in such a way that the test piece, in particular a longitudinal direction of the test piece, includes an angle between 15° and 25°, preferably as close as possible to 20°, with a vertical that extends preferably parallel to a gravitation direction. The test piece is in the run of the salt spray fog test in particular held in the holding unit in such a way that the test piece is free of a contact with a wall of the test chamber. The test piece is in the run of the salt spray fog test in particular held in the holding unit in such a way that the test piece, in particular the surface of the test piece, is exposed to the salt spray fog as completely as possible. The test piece is in the run of the salt spray fog test in particular held in the holding unit in such a way that drops of the salt solution falling from the test piece and/or from the holding unit onto further test pieces situated underneath is excluded.

It is further proposed that at least a portion of the wire, in particular at least a portion of a wire mesh that is implemented of the wire, with the corrosion protection, in particular with the corrosion protection layer, in a test run by means of a salt spray fog test has a corrosion resistance that is higher than a corrosion resistance of a further wire having a same circumference, in particular a same diameter and/or preferably a same cross section, as well as a zinc coating; said zinc coating having a mass per unit area of at least 115 g/m², preferably at least 150 g/m², advantageously at least 200 g/m² and preferentially maximally 215 g/m², in particular at least of a portion of a wire mesh implemented of a further wire, said further wire having a same circumference, in particular a same diameter and/or preferably a same cross section, as well as a zinc coating, said zinc coating having a mass per unit area of at least 115 g/m², preferably at least 150 g/m², advantageously at least 200 g/m² and preferentially maximally 215 g/m². This advantageously allows achieving a high resistance of the wire, in particular of the wire netting device and/or of a wire net, preferably a safety net, in particular with respect to corrosive environment conditions, e.g. weather conditions. Advantageously herewith a long lifetime of the wire, in particular of the wire netting device and/or of the wire net, is achievable, as a result of which it is in particular possible to reduce maintenance and/or upkeep costs. Moreover an increased reliability and/or safety of the wire netting device and/or of the wire net are/is advantageously facilitated.

Beyond this it is proposed that at least a portion of the wire with the corrosion protection, in particular the corrosion protection layer, in particular at least a portion of a wire mesh implemented of the wire with the corrosion protection, in particular the corrosion protection layer, in a test run by means of a sulfur dioxide test has a corrosion resistance of more than 500 hours, preferably more than 600 hours, advantageously more than 700 hours, preferentially more than 800 hours and especially preferentially more than 1,000 hours. This advantageously allows achieving a high resistance of the wire, in particular of the wire netting device and/or of a wire net, preferably a safety net, in particular with respect to corrosive environment conditions, e.g. weather conditions. Advantageously herewith a long lifetime of the wire, in particular of the wire netting device and/or of the wire net, is achievable, as a result of which it is possible to reduce in particular maintenance and/or upkeep costs. Moreover an increased reliability and/or safety of the wire netting device and/or of the wire net is made possible. Beyond this the wire netting device and/or the wire net can advantageously be used in sites with highly corrosive environment conditions, for example in environments with increased concentrations of aggressive gases, e.g. sulfur dioxide ($SO_2$) in volcanically active regions, while maintaining sufficient lifetime and/or economical efficiency.

A "sulfur dioxide test" is in particular to mean a Kesternich test, preferably a test for an evaluation of a corrosion protection effect of a corrosion protection, in particular of a corrosion protection layer. In particular, in the sulfur dioxide test a test piece undergoes in a test chamber an impact of an atmosphere containing sulfur dioxide, which in particular exerts a corrosive effect onto the test piece. The sulfur dioxide test is preferably carried out in accordance with the customary edge conditions for sulfur dioxide tests, known to someone skilled in the art, in particular those given in the standard DIN 50018:1997-6. In particular, the sulfur dioxide test comprises at least one test cycle, preferably a plurality of test cycles. A test cycle of the sulfur dioxide test preferentially comprises at least two phases, whose edge conditions, in particular test chamber temperatures and/or relative humidities of a test chamber, in particular differ from one another. In the sulfur dioxide test, a volume concentration of sulfur dioxide relative to a total inner volume of the test chamber at the start of a test cycle of the sulfur dioxide test, in particular of a first phase of a test cycle of the sulfur dioxide test, is in particular approximately 0.33%. Alternatively it is conceivable that the sulfur dioxide test may be carried out with a sulfur dioxide concentration of approximately 0.67% volume percent, which is approximately twice as high. In that case, the resulting hour values for the corrosion resistance will in particular be approximately reduced by half. In particular, in the course of the test cycle of the sulfur dioxide test, the sulfur concentration decreases, in particular due to sulfur dioxide being dissolved in water, an effective sulfur dioxide concentration amounting to approximately a seventh part of the initial sulfur dioxide concentration. During the first phase of the test cycle of the sulfur dioxide test, the test chamber temperature is in particular in a range $(40\pm3)°$ C. During the first phase of the test cycle of the sulfur dioxide test, a relative humidity of the test chamber is in particular about 100%. Preferentially in the first phase of the test cycle of the sulfur dioxide test condensation occurs on a surface of the test piece. The first phase of the test cycle of the sulfur dioxide test preferably takes eight hours, in particular including the heating up of the test chamber. During the second phase of the test cycle of the sulfur dioxide test, the test chamber temperature is in particular in a range between 18° C. and 28° C. During the second phase of the test cycle of the sulfur dioxide test, the relative humidity of the test chamber is in particular maximally 75%. The second phase of the test cycle of the sulfur dioxide test preferably takes sixteen hours, in particular including approximately 15 hours for cooling and ventilating the test chamber During the test cycle of the sulfur dioxide test, a volume fraction of a water level in a bottom region of the test chamber is preferably maximally 0.67%. Preferentially, during the sulfur dioxide test a test piece is arranged in the test chamber vertically in a gravitation direction. When the sulfur dioxide test is executed, the test cycle of the sulfur dioxide test is in particular carried out several times in sequence, preferably until it is possible to determine a value of the corrosion resistance, preferentially until a corrosion parameter of the test piece has exceeded a defined threshold value.

It is moreover proposed that at least a portion of the wire, in particular at least a portion of a wire mesh that is implemented of the wire, with the corrosion protection, in particular with the corrosion protection layer, in a test run by means of a sulfur dioxide test has a corrosion resistance that is higher than a corrosion resistance of a further wire having a same circumference, in particular a same diameter and/or preferably a same cross section as the wire, and having a zinc coating, said zinc coating having a mass per unit area of at least 115 g/m², preferably at least 150 g/m², advantageously at least 200 g/m² and preferentially maximally 215 g/m². This advantageously allows achieving a high resistance of the wire, in particular of the wire netting device and/or of a wire net, preferably a safety net, in particular with respect to corrosive environment conditions, e.g. weather conditions. Advantageously herewith a long lifetime of the wire, in particular of the wire netting device and/or of the wire net, is achievable, as a result of which it is possible to reduce in particular maintenance and/or upkeep costs. Moreover an increased reliability and/or safety of the wire netting device and/or the wire net may advantageously be made possible.

Beyond this it is proposed that at least a portion of the wire, in particular at least a portion of a wire mesh that is implemented of the wire, with the corrosion protection, in particular with the corrosion protection layer, in an exposition test, in particular in a highly corrosive environment, shows within a defined time interval a corrosion that is substantially smaller, in particular a lower number and/or a smaller total area of corroded places on a wire surface at least of a portion, than a portion, in particular a portion that has undergone the same exposition test at the same time and preferably has an at least substantially identical shape, of a further wire having a same length, a same circumference, in particular a same diameter and/or preferably a same cross section, and having a zinc coating, said zinc coating having a mass per unit area of at least 115 g/m², preferably at least 150 g/m², advantageously at least 200 g/m² and preferentially maximally 215 g/m². This advantageously allows achieving a high resistance of the wire, in particular of the wire netting device and/or of a wire net, preferably a safety net, in particular with respect to corrosive environment conditions, e.g. weather conditions. Advantageously herewith a long lifetime of the wire, in particular of the wire netting device and/or of the wire net, is achievable, as a result of which it is possible to reduce in particular maintenance and/or upkeep costs. Moreover an increased reliability and/or safety of the wire netting device and/or the wire net may advantageously be made possible. An "exposition test" is in particular to mean a, preferably controlled, exposition of a test piece under real environment conditions. Preferentially in an exposition test at least the test piece and/or at least one reference piece are/is held stationarily in a position in which in particular the at least one test piece and/or the at least one reference piece are/is exposed to comparable environment and/or weather conditions. By "weather conditions" are in particular wind, precipitation, frosting, freezing, solar irradiation, air humidity and/or temperature to be understood. By "environment conditions" are in particular concentrations of atmosphere gas and/or of aerosol particles to be understood and/or weather-independent external influences, e.g. a vegetation cover. In particular, an exposition test "in a highly corrosive environment" is to mean an exposition on an exposition site featuring increased salt concentrations in the air, increased concentrations of oxidizing gases, e.g. $SO_x$, $NO_x$, $O_3$ and/or Cl compounds in the air, and/or increased concentrations of oxidizing particle components, e.g. $SO_4$, $NO_3$ and/or OH, in the air. "Increased" is in particular to mean increased at least by 50%, preferably increased by at least 100% and preferentially increased by at least 300% with respect to a worldwide average. In particular the exposition site is embodied as a site fulfilling of the criteria (given below) at least 8 of 13, preferably at least 10 of 13, advantageously at least 12 of 13 and preferentially 13 of 13, and/or which is particularly preferably situated on the isle of Helgoland, Germany, and/or on the isle of Amami-Ōshima, Japan: 1) in particular a distance in all four cardinal directions that is shorter than 2 km from an ocean coast; 2) in particular having at least 160 precipitation days per year, preferably more than 10 precipitation days in every month of the year; 3) an average annual temperature amplitude that in particular exceeds 10° C.; 4) an average annual temperature amplitude of in particular less than 20° C.; 5) in particular an average annual temperature minimum of at least −2° C.; 6) in particular an average annual temperature maximum of no more than 23° C.; 7) in particular an average annual precipitation quantity of at least 500 mm; 8) in particular an average annual precipitation quantity of maximally 800 mm; 9) in particular an average annual solar irradiation of at least 2500 W/(m²*day); 10) in particular an average annual solar irradiation of maximally 3500 W/(m²*/day); 11) in particular a minimum average annual wind speed of at least 15 knots, the average wind speed per month being in every month of the year greater than 10 knots; 12) in particular a wind probability of wind forces greater than or equal to 4 according to the Beaufort scale exceeding 60% in every month of the year; 13) in particular an average annual relative air humidity of more than 85%, the average monthly relative air humidity being in every month of the year greater than 75%. In particular, an average value comprises at least the past 10 years, in particular the time interval from 2006 to 2016, preferably the past 15 years, in particular the time interval from 2001 to 2016, and preferentially the past 25 years, in particular the time interval from 1991 to 2016. A "defined time interval" in particular comprises at least one year, preferably at least two years, advantageously at least three years, preferentially at least five years, and particularly preferably no more than ten years. A "corrosion that is substantially smaller" is in particular intended to mean a number of corroded places on a wire surface at least of a portion that is smaller by at least 5%, preferably smaller by at least 10%, preferentially by at least 25% and preferably by at least 50%, and/or to mean a corroded area that is smaller by at least 5%, preferably by at least 10%, preferentially by at least 25% and preferably by at least 50%, relative to the entire wire surface at least of a portion. A "portion having a substantially identical shape" is identical, in particular within a range of deviations and/or differences due to production-technological reasons. Preferably, in particular apart from coatings, the wire and the further wire have at least substantially identical cross sections.

Furthermore it is proposed that the corrosion protection comprises at least one corrosion protection layer, with a mass per unit area of the corrosion protection layer, in particular at least on the surface at least of a the wire, preferably of the entire wire, of at least 215 g/m², preferably at least 255 g/m², advantageously at least 275 g/m², preferentially no less than 300 g/m², and particularly preferably no less than 400 g/m², in particular with a diameter of the wire being maximally 10 mm, preferably no more than 6 mm, advantageously no more than 5 mm, preferentially maximally 4 mm and particularly preferably at least 2 mm. This advantageously allows achieving a high degree of resistance of the wire netting device. In particular, this allows increasing a lifetime of a wire net. Advantageously a thick corrosion protection layer realizes for underlying materials, for example high-tensile steel, an effective long-time protection against corrosion. In particular, the corrosion protection layer is implemented as a zinc coating. Preferably the corrosion protection layer is implemented at least partially as an active corrosion protection layer, which in particular realizes an anodic corrosion protection. It is moreover conceivable that the corrosion protection layer comprises a plurality of coatings, in particular a plurality of coatings lying above each other, in particular with different material properties present in at least one layer. Alternatively and/or additionally it is conceivable that the corrosion protection layer is at least partially implemented as a passive corrosion protection layer and/or as a cathodic corrosion protection layer. Preferentially the corrosion protection layer at least fulfills the requirements given in the standard DIN EN 102064-2:2012-3 for a minimum quantity of a coating with a corrosion protection layer for class A wires.

It is also proposed that the corrosion protection comprises at least one corrosion protection layer that is embodied as a zinc-aluminum coating, in particular with an aluminum fraction of approximately 5%. This advantageously allows achieving a high resistance of the wire netting device. It is in particular possible to increase a lifetime of a wire net. Advantageously such a corrosion protection layer realizes an effective long-time protection for underlying materials, for example high-tensile steel, against corrosion. Advantageously a zinc-aluminum coating realizes an active anodic corrosion protection. A zinc-aluminum coating furthermore advantageously has a smooth surface. Advantageously a zinc-aluminum coating has a good adhesive strength, in particular a better adhesive strength than a pure zinc coating, on a steel surface. In particular, the zinc-aluminum coating has a mass per unit area, in particular at least on the surface at least of a portion of the wire, preferably of the whole wire, of at least 150 g/m$^2$, preferentially at least 215 g/m$^2$, advantageously at least 255 g/m$^2$, preferably at least 300 g/m$^2$ and especially preferentially at least 350 g/m$^2$. In particular, the aluminum fraction of the corrosion protection layer is about 5%, as a result of which a eutectic structure of the zinc-aluminum alloy may be made possible.

Beyond this it is proposed that the zinc-aluminum coating comprises at least one additive, different than aluminum and/or zinc, preferably magnesium, which in particular comprises at least 0.5% of the corrosion protection layer. This advantageously allows further increasing a resistance of the wire netting device. Alternatively the additive may comprise a metal different than magnesium and/or may comprise a plurality of different metals. It is moreover conceivable that the zinc-aluminum coating comprises at least one further additive different than aluminum, than magnesium and/or than zinc.

It is further proposed that the corrosion protection is implemented at least partly integrally with the wire. This advantageously allows avoiding a peeling-off of the corrosion protection. In particular, a resistance and/or lifetime is further increasable as a result of this. Preferably the wire is implemented at least partly of, in particular high-tensile, stainless steel, preferentially of, in particular high-tensile, stain-resistant steel or of, in particular high-tensile, non-rusting steel.

Moreover it is proposed that the corrosion protection, in particular the corrosion protection layer, comprises at least one coating which is to a large extent embodied of an at least partially organic and/or at least partially inorganic carbon compound, preferably graphene. As a result of this, a resistance of the wire netting device is advantageously further increasable. Advantageously a coating which is to a large extent embodied of an at least partially organic and/or at least partially inorganic carbon compound, preferentially graphene, implements a passive corrosion protection. Advantageously such a corrosion protection layer is particularly resistant against damaging, like for example tears and/or scratches. "To a large extent" is in particular to mean at least by 51%, preferably at least by 66%, advantageously at least by 80%, preferably at least by 95% or especially preferentially at least by 100%.

It is further proposed that at least a portion of the wire comprises a corrosion protection, in particular a corrosion protection layer, which in at least one test run survives without damages, in particular without breaking, an at least M-fold back-and-forth bending of the wire around at least one bending cylinder that has a diameter of maximally 8d, preferably no more than 6d, preferentially maximally 4d and particularly preferably no more than 2d, by at least 90° respectively, in opposite directions, wherein M can be determined, if applicable by rounding-down, to be $C*R^{-0.5}*d^{-0.5}$, and wherein d is a diameter of the wire in mm, R is a tensile strength of the wire given in N mm$^{-2}$ and C is a factor of at least 750 N$^{0.5}$ mm$^{0.5}$, preferably at least 850 N$^{0.5}$ mm$^{0.5}$, advantageously at least 1000 N$^{0.5}$ mm$^{0.5}$, preferentially at least 1300 N$^{0.5}$ mm$^{0.5}$ and particularly preferably at least 1500 N$^{0.5}$ mm$^{0.5}$. In this way advantageous properties are achievable concerning a processability and/or a manufacturability. Furthermore a wire netting device, in particular a wire mesh, with a high load capacity and/or particular high level of corrosion resistance can be provided. Moreover a high resistance is achievable. Furthermore, in a production of wire netting devices, in particular wire meshes, a breaking up, peeling-off and/or damaging of a corrosion protection, in particular of a corrosion protection layer, is advantageously avoidable. In particular, in a production of wire netting devices, in particular wire meshes, test runs may be dispensed with, at least to a large extent. Beyond this it is possible to easily and/or quickly and/or reliably identify wires suitable for a wire netting device, in particular for a wire mesh, having a high resistance, in particular against corrosion, preferably having at the same time a high load capacity. In particular, it is possible to provide a selection procedure for a suitable wire that is considerably more strict and/or more specific regarding a load capacity than a reverse bend test according to the standards DIN EN 10218-1:2012-03 and DIN° EN° 10264-2:2012-03. In the reverse bending, the wire is preferably bent around two opposite-situated bending cylinders which are implemented identically. Advantageously the bending cylinders are configured to carry out the back-and-forth bending in the reverse bend test without deformation and/or damaging. "Without damaging" is in particular to mean free of tears, free of peeling-off, free of breaks and/or free of comparable damages that occur in a bending.

Moreover it is proposed that at least a portion of the wire comprises a corrosion protection, in particular a corrosion protection layer, which in at least one test run, in particular further test run, survives without damages, in particular without breaking, an N-fold twisting of the wire, wherein N can be determined, if applicable by rounding-down, to be $B*R^{-0.5}*d^{-0.5}$, and wherein d is a diameter of the wire in mm, R is a tensile strength of the wire in N mm$^{-2}$ and B is a factor of at least 960 N$^{0.5}$ mm$^{0.5}$, preferably at least 1050 N$^{0.5}$ mm$^{0.5}$, advantageously at least 1200 N$^{0.5}$ mm$^{0.5}$, preferentially at least 1500 N$^{0.5}$ mm$^{0.5}$ and particularly preferably at least 2000 N$^{0.5}$ mm$^{0.5}$. This advantageously allows achieving a high resistance of a wire netting device, in particular a wire mesh, in particular against corrosion. Furthermore, in a production of wire netting devices, in particular wire meshes, a breaking up, peeling-off and/or damaging of a corrosion protection, in particular a corrosion protection layer, are/is advantageously avoidable. In particular, in a production of wire netting devices, in particular wire meshes, test runs can advantageously be dispensed with, at least to a large extent. It is moreover possible to easily and/or quickly and/or reliably identify wires suitable for a wire netting device, in particular for a wire mesh, having a high resistance, in particular against corrosion, and preferably having at the same time a high level of load capacity. In particular, it is possible to provide a selection procedure for a suitable wire that is considerably more strict and/or more specific regarding a load capacity than a twisting test according to the standards DIN EN 10218-1:2012-03 and DIN° EN° 10264-2:2012-03. A "twisting" is in particular to mean a twisting of a clamped-in wire around a longitudinal axis.

It is also proposed that at least a portion of the wire comprises a corrosion protection, in particular a corrosion protection layer, which in at least one test run, in particular additional further test run, survives without damages, in particular without breaking, a winding of the wire around a winding mandrel the diameter of which at least substantially corresponds to a diameter of the wire. This advantageously allows achieving a high resistance of a wire netting device, in particular a wire mesh, in particular against corrosion. Furthermore, in a production of wire netting devices, in particular wire meshes, a breaking up, peeling-off and/or damaging of a corrosion protection, in particular a corrosion protection layer, are/is advantageously avoidable. In particular, in a production of wire netting devices, in particular wire meshes, test runs can advantageously be dispensed with, at least to a large extent. It is moreover possible to easily and/or quickly and/or reliably identify wires suitable for a wire netting device, in particular for a wire mesh, having a high resistance, in particular against corrosion, and preferably having at the same time a high level of load capacity. In particular, in a winding of the wire around the winding mandrel the wire is bent around the winding mandrel, in an at least substantially spirally shape, by at least 360°.

Furthermore a wire net, in particular a safety net, preferably for a securing against rockfall, is proposed, with a wire netting device comprising a plurality, in particular a plurality exceeding two, of mutually engaging net elements, which are at least partly implemented in a helical shape. This advantageously allows achieving a wire net having a high resistance, in particular against corrosion, in particular with respect to corrosive environment conditions, for example weather conditions. Advantageously herewith a long lifetime of the wire net is achievable, as a result of which in particular maintenance and/or upkeep costs can be reduced. Moreover it is advantageously possible to facilitate an increased reliability and/or safety of the wire net. The wire net is in particular embodied as a wire mesh with a plurality of helices which are braided with each other. Different helices contact each other in particular in regions of narrowest bends of the helix. In particular, the wire net is embodied as a slope stabilization, as a safety fence, as a catch fence, as a rockfall-protection net, as a barrier fence, as a fish-farming net, as a predator-protection net, as an enclosure fence, as a tunnel securing, as a landslide barrier, as a motorsport debris fence, as a road fence, as an avalanche protection, or the like. In particular, due to its great strength and/or load capacity, applications as a covering and/or as an envelope, e.g. of power stations, factory buildings, residential houses or other buildings, as an explosion protection, as a projectile protection, as a shield against flying objects, as a catch net, as a ram protection, or the like are also conceivable. The wire net may, for example, be designed and/or arranged and/or mounted horizontally or vertically or obliquely, in particular with respect to a ground. In particular the wire net is implemented to be planar. Advantageously the wire net has a regular structure and/or a structure that is periodical in at least one direction. Preferably the wire net can be rolled up and/or rolled out, in particular around an axis that extends in parallel to the main extension direction of the helix. In particular, a roll that has been rolled up from the wire net is capable of being rolled out in a direction that is perpendicular to the main extension direction of the helix.

Beyond this a wire net, in particular safety net, is proposed, preferably for a securing against rock fall, with a wire netting device comprising a plurality, in particular a plurality exceeding two, of mutually engaging net elements, which are embodied to be at least partly closed in themselves, preferably closed in themselves in a ring shape. This advantageously allows achieving a wire net having a high resistance, in particular with respect to corrosion, in particular with respect to corrosive environment conditions, e.g. weather conditions. Herewith advantageously a long lifetime of the wire net is achievable, as a result of which in particular maintenance and/or upkeep costs can be reduced. It is moreover advantageously possible to facilitate an increased reliability and/or safety of the wire net. In particular the wire net is implemented as a wire mesh comprising a plurality of mutually engaging net elements, in particular wire rings. Herein different net elements, in particular wire rings, in particular contact at least one, preferably no more than four neighboring net elements, in particular wire rings.

Furthermore a method is proposed for a production of a wire net, in which the wire net is produced from wire netting devices. In this way a wire net having a high resistance, in particular with respect to corrosion, in particular with respect to corrosive environment conditions, for example weather conditions, is advantageously achievable.

In addition a method is proposed for an identification of a suitable wire, in particular implemented of a high-tensile steel, for a wire netting device, preferably for a wire net, in which method a corrosion resistance of a test piece of the wire, in particular of a test piece of a wire mesh that is implemented of the wire, is determined by means of an alternating climate test, by a salt spray fog test, by a sulfur dioxide test and/or by an exposition test. This advantageously allows achieving a wire, in particular a wire netting device, preferentially a wire net, with a high degree of resistance, in particular against corrosion, in particular against corrosive environment conditions, e.g. weather conditions. Advantageously it is possible to determine a suitability of a wire for a manufacturing of a wire net previously to production of the completed wire net. As a result, erroneous production and/or waste production are/is advantageously avoidable, and costs are thus reducible. Advantageously a wire is chosen for a manufacturing process which has shown, in the alternating climate test, the salt spray fog test, the sulfur dioxide test and/or the exposition test, sufficient corrosion resistance, in particular a corrosion resistance exceeding a value of 500 hours, preferably 600 hours, advantageously 700 hours, preferentially 800 hours and particularly preferably 1000 hours. Preferentially a wire having shown, in the alternating climate test, the salt spray fog test, the sulfur dioxide test and/or the exposition test, an insufficient corrosion resistance, which in particular has a value below 500 hours, preferentially 600 hours, advantageously 700 hours, preferably 800 hours and particularly preferably 1000 hours, is sorted out previously to a manufacturing process.

Furthermore a method for a production of a wire netting device is proposed in which, to form a net element, a wire is bent with a bending radius, in particular a maximum bending radius, that is in each work step greater than 5 mm, preferably greater than 6 mm, advantageously greater than 7 mm, preferentially greater than 9 mm and particularly preferably smaller than 10 mm. In this way advantageously a damaging, in particular breaking-up and/or peeling-off, of the corrosion protection, in particular the corrosion protection layer, is avoidable, in particular during a manufacturing process, as a result of which it is advantageously possible to achieve a high resistance and/or a long lifetime of a wire netting device that is produced in this manner.

Moreover a method for a production of a wire netting device is proposed, in which, for forming a net element, a wire is bent with a bending speed, in particular a maximally occurring bending speed, that is less than 360 degrees/sec, preferentially less than 270 degrees/sec, advantageously less than 180 degrees/sec, preferably less than 90 degrees/sec and particularly preferably more than 45 degrees/sec. In this way advantageously a damaging, in particular breaking-up and/or peeling-off, of the corrosion protection, in particular the corrosion protection layer, is avoidable, in particular during a manufacturing process, as a result of which it is advantageously possible to achieve a high resistance and/or a long lifetime of a wire netting device that is produced in this manner.

Beyond this a method for a production of a wire netting device is proposed in which, during a coating of a wire, a coating temperature, in particular a maximum coating temperature, remains in each work step below 440° C., preferably below 435° C., advantageously below 430° C., preferentially below 425° C. and particularly preferably above 421° C. In this way advantageously a damaging, in particular breaking-up and/or peeling-off, of the corrosion protection, in particular the corrosion protection layer, is avoidable, in particular during a manufacturing process, as a result of which it is advantageously possible to achieve a high resistance and/or a long lifetime of a wire netting device that is produced in this manner.

It is also proposed that heat acting onto the wire during a coating of the wire is used for augmenting a strength, in particular a tensile strength, of the wire. This advantageously allows increasing efficiency, in particular as it is possible to use heat occurring in one process for a further process. Moreover, in particular a too great bristliness of a coated wire is avoidable, in particular if during the coating process an additional leakage of carbon from a steel, which the wire is in particular at least partially made of, is made use of for an adjustment of a strength of the steel.

Furthermore a test method is proposed, for testing a corrosion resistance of a wire of a wire netting device, preferably of a wire net, via a salt spray fog test and/or a sulfur dioxide test, in which test method a test chamber temperature is varied during the salt spray fog test and/or during the sulfur dioxide test. This advantageously allows improving a reliability of the test method. In particular, it is advantageously possible to adapt test conditions closer to real conditions which the wire netting device is exposed to, in particular when used in the field. Preferentially, in the test method the test chamber temperature is varied periodically at least between a minimum and a maximum test chamber temperature. In particular, the minimum test chamber temperature is at least below 25° C., preferably below 15° C., advantageously below 5° C., preferentially below −5° C., and particularly preferably above −20° C. In particular, the maximum test chamber temperature is at least above 25° C., preferably above 35° C., advantageously above 40° C., preferentially above 55° C., and particularly preferably below 70° C. In particular a maximum test chamber temperature amplitude between a minimum test chamber temperature and a maximum test chamber temperature is at least 15° C., preferably at least 30° C., advantageously at least 50° C., preferentially at least 70° C. and particularly preferably no more than 90° C. In particular, a variation of the test chamber temperature is effected at regular intervals and preferably comprises a sequence of at least one, preferentially at least a plurality of test chamber temperature increase(s), and of at least one, preferably at least a plurality of test chamber temperature decrease(s). An increase and/or decrease of the test chamber temperature may be realized in particular continuously or step-wise, in particular in the manner of a stepped pyramid.

It is further proposed that, in particular in the test method, a salt concentration is varied during the salt spray fog test and/or a sulfur dioxide concentration is varied during the sulfur dioxide test. This advantageously allows improving a reliability of the test method. In particular, it is possible to adapt test conditions closer to real conditions which the wire netting device is exposed to, in particular when used in the field. Preferably, in the test method the concentration of salt or sulfur dioxide is varied periodically, at least between a minimum and a maximum concentration of salt or sulfur dioxide. In particular, the minimum salt concentration is at least below 50 g/l, preferably below 40 g/l, advantageously below 30 g/l, preferentially below 20 g/l, and particularly preferably above 10 g/l. In particular, the maximum salt concentration is at least above 50 g/l, preferably above 60 g/l, advantageously above 70 g/l, preferentially above 80 g/l, and particularly preferably below 100 g/l. In particular, a maximum salt concentration amplitude between a minimum salt concentration and a maximum salt concentration is at least 10 g/l, preferably at least 20 g/l, advantageously at least 30 g/l, preferentially at least 40 g/l, and particularly preferably no more than 100 g/l. In particular, the minimum sulfur dioxide concentration is at least below 0.33%, preferably below 0.25%, advantageously below 0.18%, preferentially below 0.10%, and particularly preferably above 0.05%. In particular, the maximum sulfur dioxide concentration is at least above 0.33%, preferably above 0.50%, advantageously above 0.70%, preferentially above 0.90%, and particularly preferably no more than 1.10%. In particular, a maximum sulfur dioxide concentration amplitude between a minimum sulfur dioxide concentration and a maximum sulfur dioxide concentration is at least 0.10%, preferably at least 0.30%, advantageously at least 0.50%, preferentially at least 0.70%, and particularly preferably no more than 1.00%. In particular a variation of the salt concentration or sulfur dioxide concentration is effected at regular intervals and preferentially comprises a sequence of at least one, preferably at least a plurality of increase(s) of a salt concentration or sulfur dioxide concentration and at least one, preferably a plurality of decrease(s) of a salt concentration or sulfur dioxide concentration. An increase and/or decrease of the salt concentration or sulfur dioxide concentration may be realized in particular continuously or step-wise, in particular in the manner of a stepped pyramid.

Moreover a test device is proposed for testing a corrosion resistance of at least one test piece of a wire of a wire netting device, preferably of a wire net. In this way a wire, in particular a wire netting device, preferably a wire net, is advantageously achievable, with a high resistance, in particular against corrosion, in particular with respect to corrosive environment conditions, for example weather conditions. It is advantageously possible to determine a suitability of a wire for manufacturing a wire net previously to a production of the completed wire net. This advantageously allows avoiding erroneous production and/or waste production, and thus in particular reducing costs.

The test device advantageously comprises at least one holding unit for a holding of at least one test piece of the wire, in particular a test piece of a wire mesh implemented of the wire, and/or of at least one reference wire, in particular a reference wire mesh, wherein test pieces, in particular all test pieces, which are positioned in the holding unit are alignable parallel to one another, and/or are arranged in such a way that the test pieces realize at least substantially identical impact surfaces for at least one, preferably all, corrosive environment condition(s) occurring in the test chamber. This advantageously allows providing a good reliability of an alternating climate test, a salt spray fog test, a sulfur dioxide test and/or an exposition test. Furthermore a high degree of comparability of test results of different test pieces, tested in the test device at the same time, is achievable.

The wire netting device according to the invention, the method according to the invention for identifying a suitable wire, the methods according to the invention for a production of a wire netting device, the test method according to the invention for testing a corrosion resistance of a wire of a wire netting device, and the test device according to the invention are herein not to be limited to the application and implementation described above. In particular, to fulfill a functionality that is described here, the wire netting device according to the invention, the method according to the invention for identifying a suitable wire, the methods according to the invention for a production of a wire netting device, the test method according to the invention for testing a corrosion resistance of a wire of a wire netting device and the test device according to the invention may comprise a number of individual elements, structural components and units that differs from a number that is mentioned here.

DRAWINGS

Further advantages will become apparent from the following description of the drawings. The drawings show seven exemplary embodiments of the invention. The drawings, the description and the claims contain a plurality of features in combination. Someone skilled in the art will purposefully also consider the features individually and will find further expedient combinations.

Figure 2A:
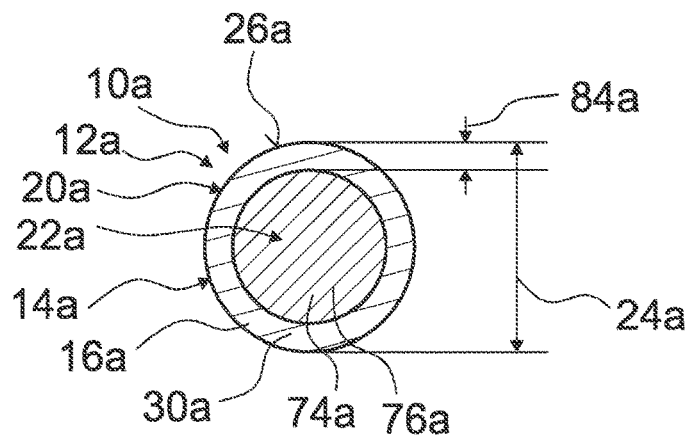
Figure 2B:
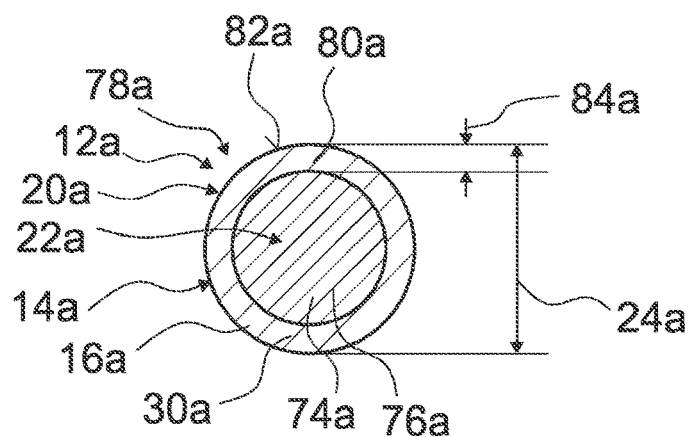
Figure 3:
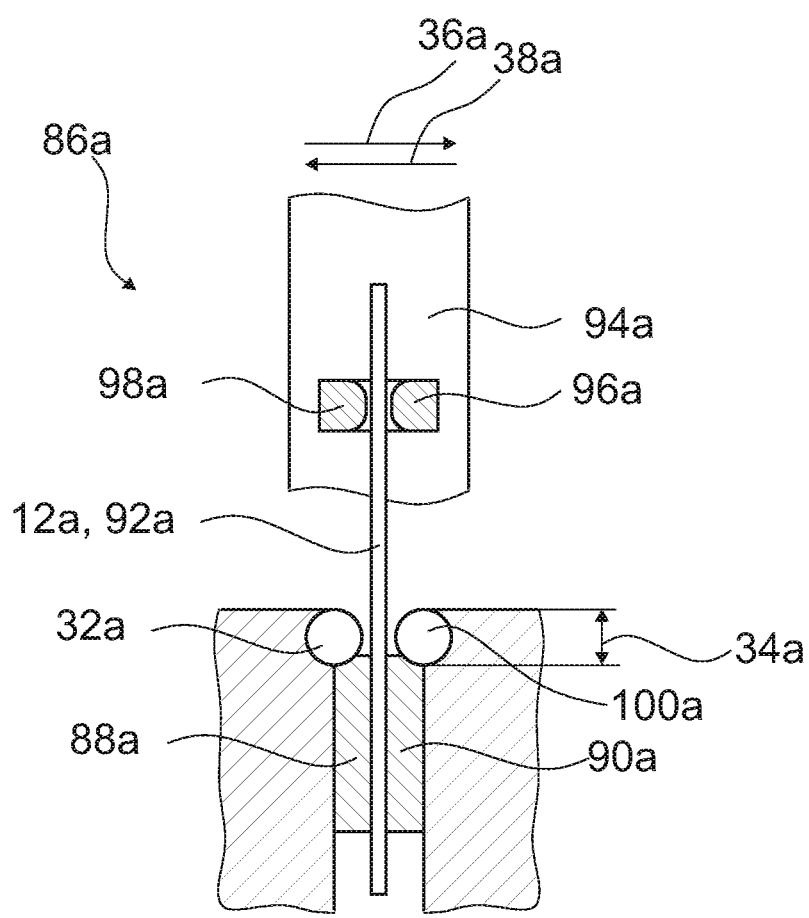
Figure 4:
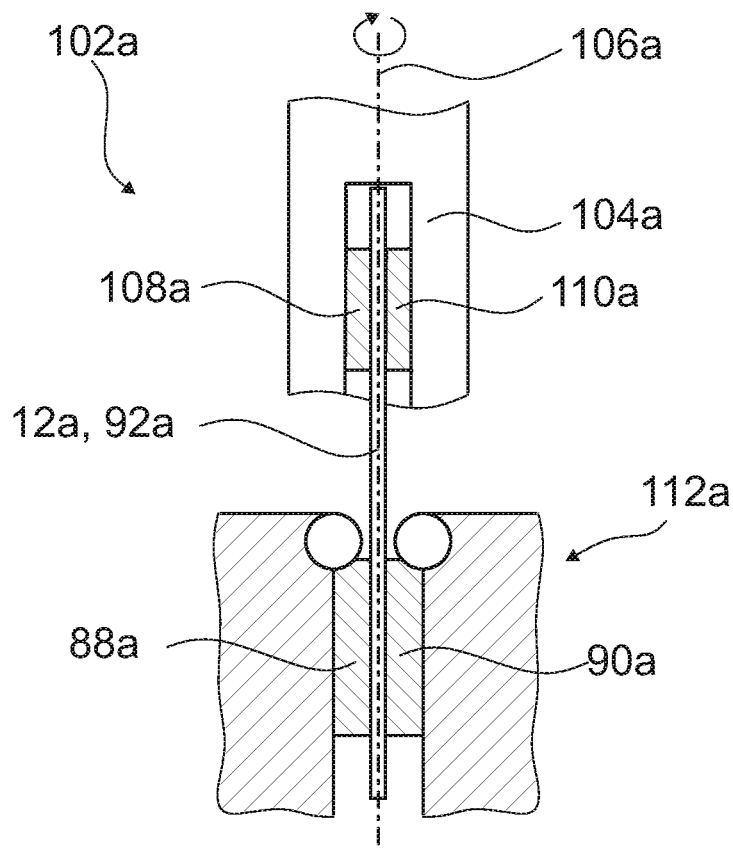
Figure 5:
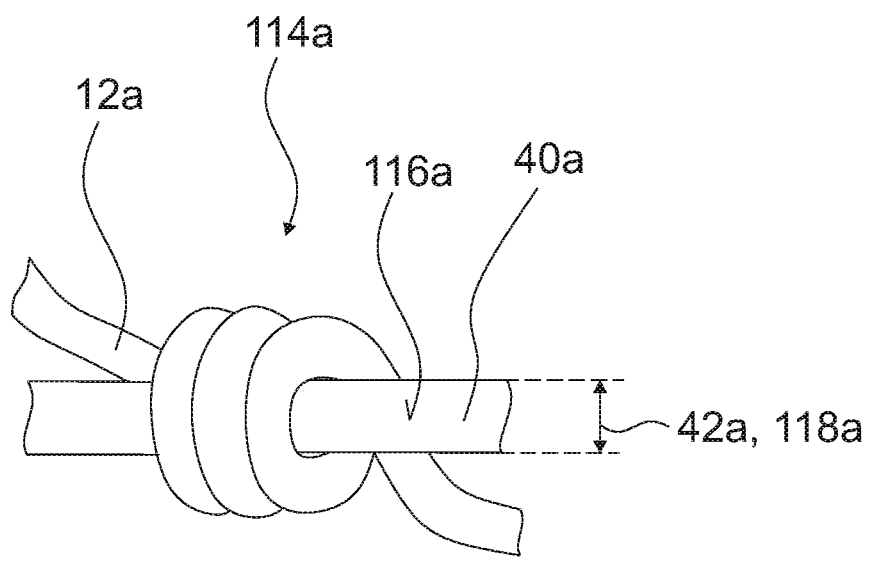
Figure 6:
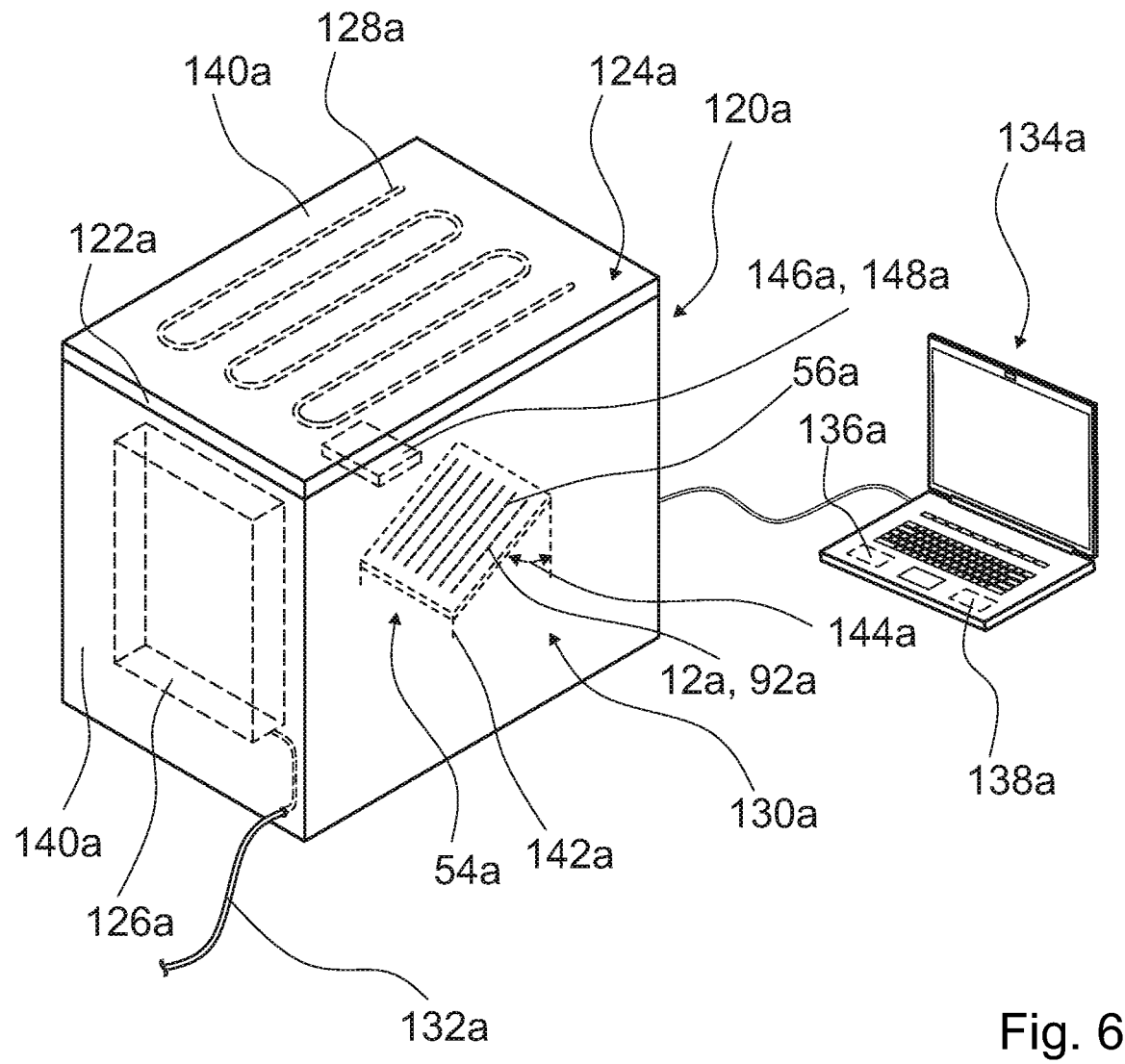
Figure 7:
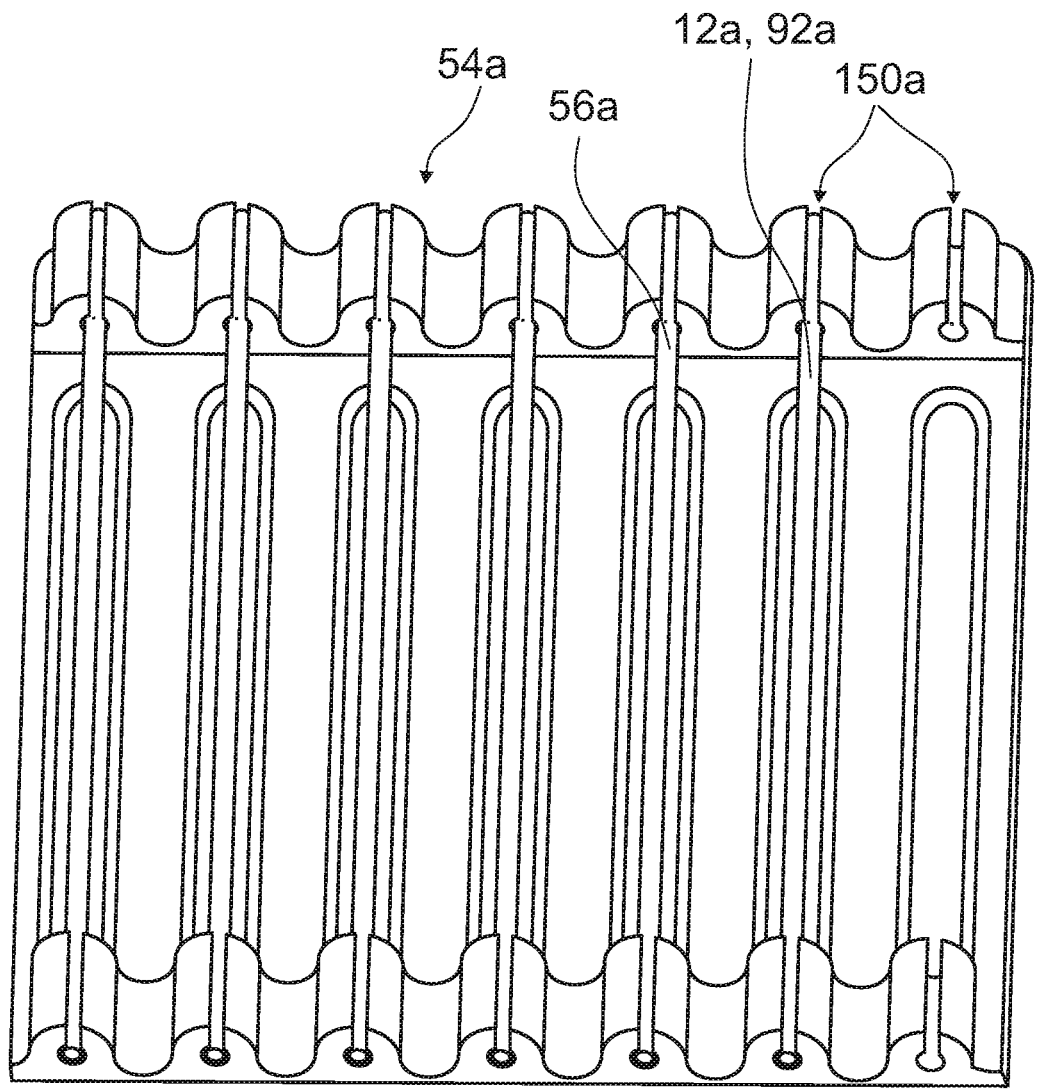
Figure 8:
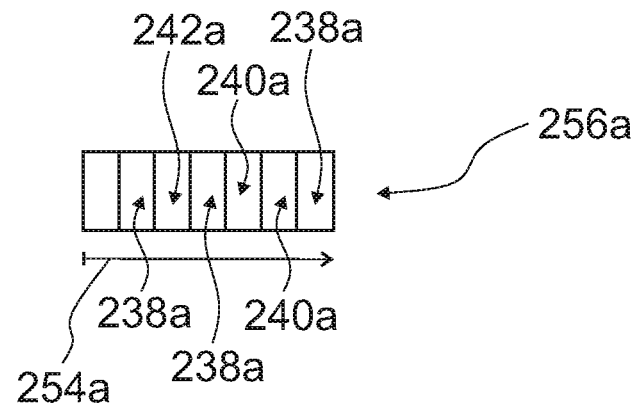
Figure 9:
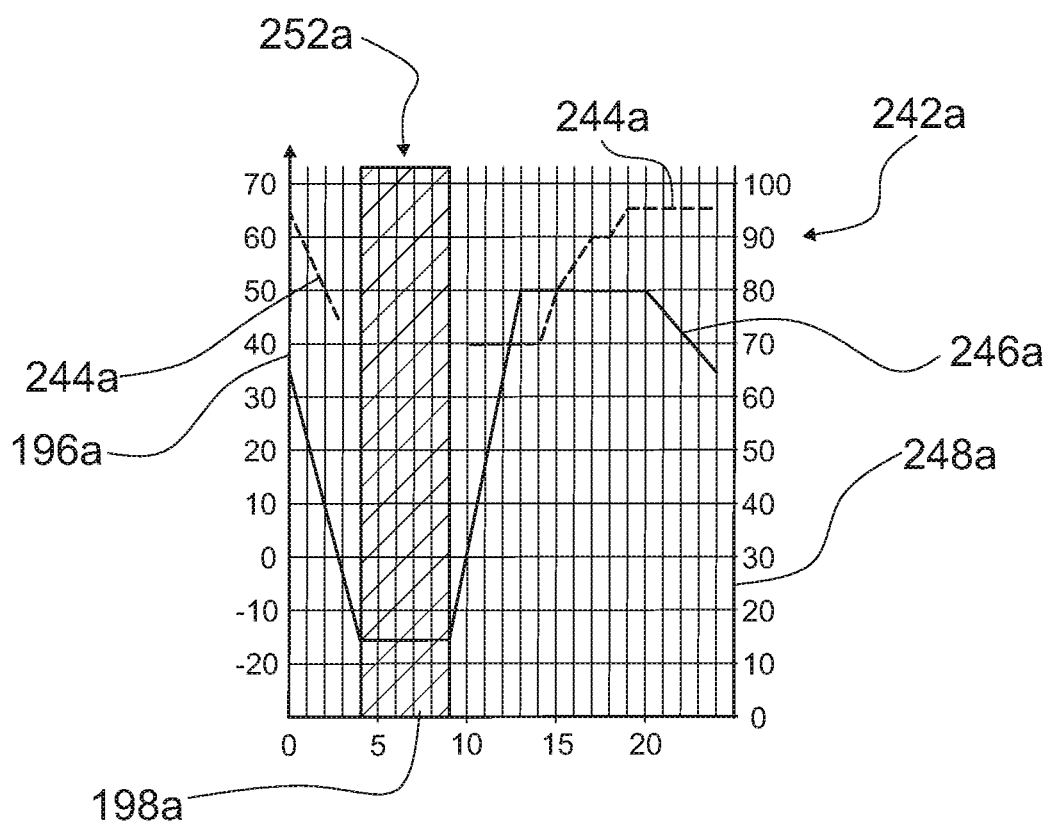
Figure 10:
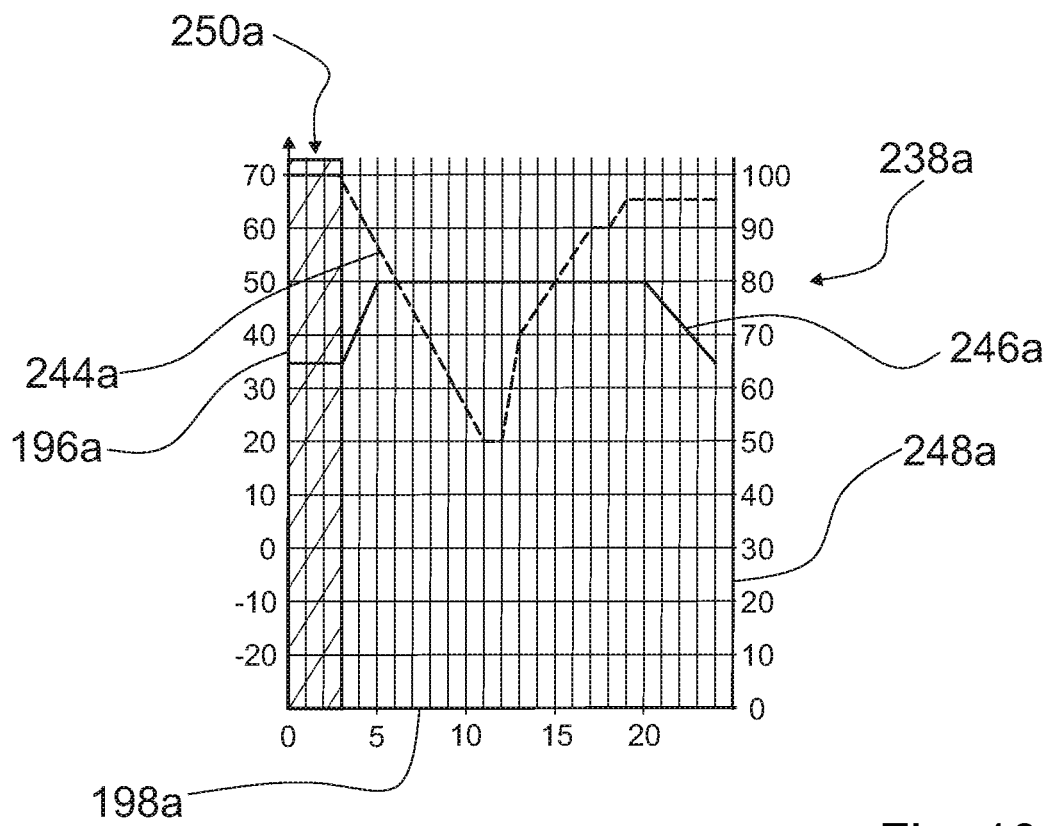
Figure 11:
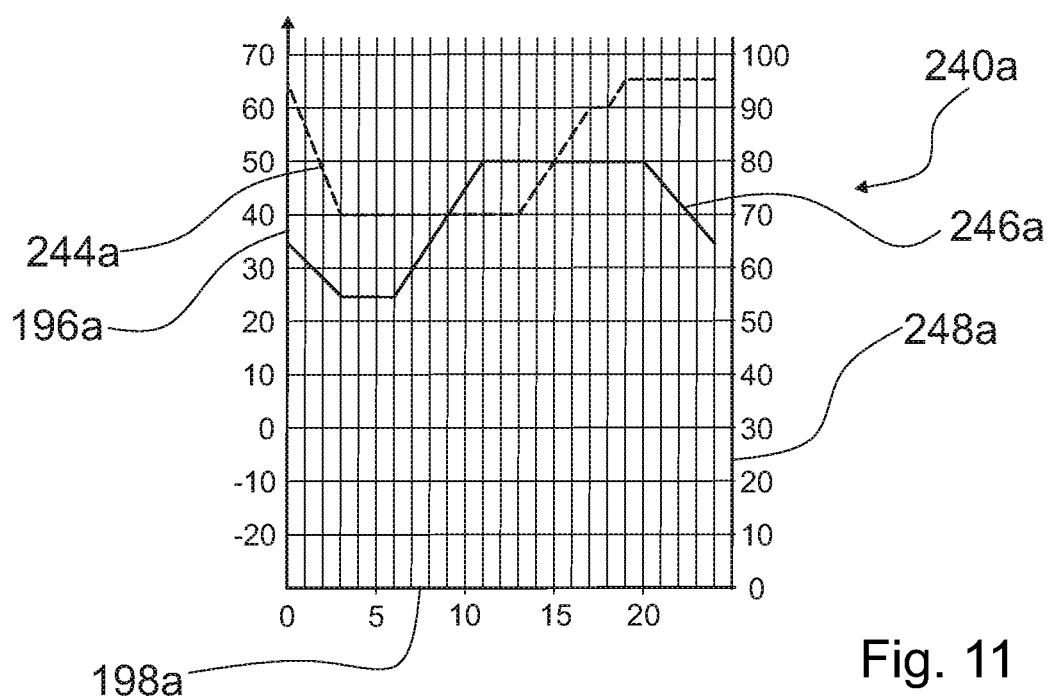
Figure 12:
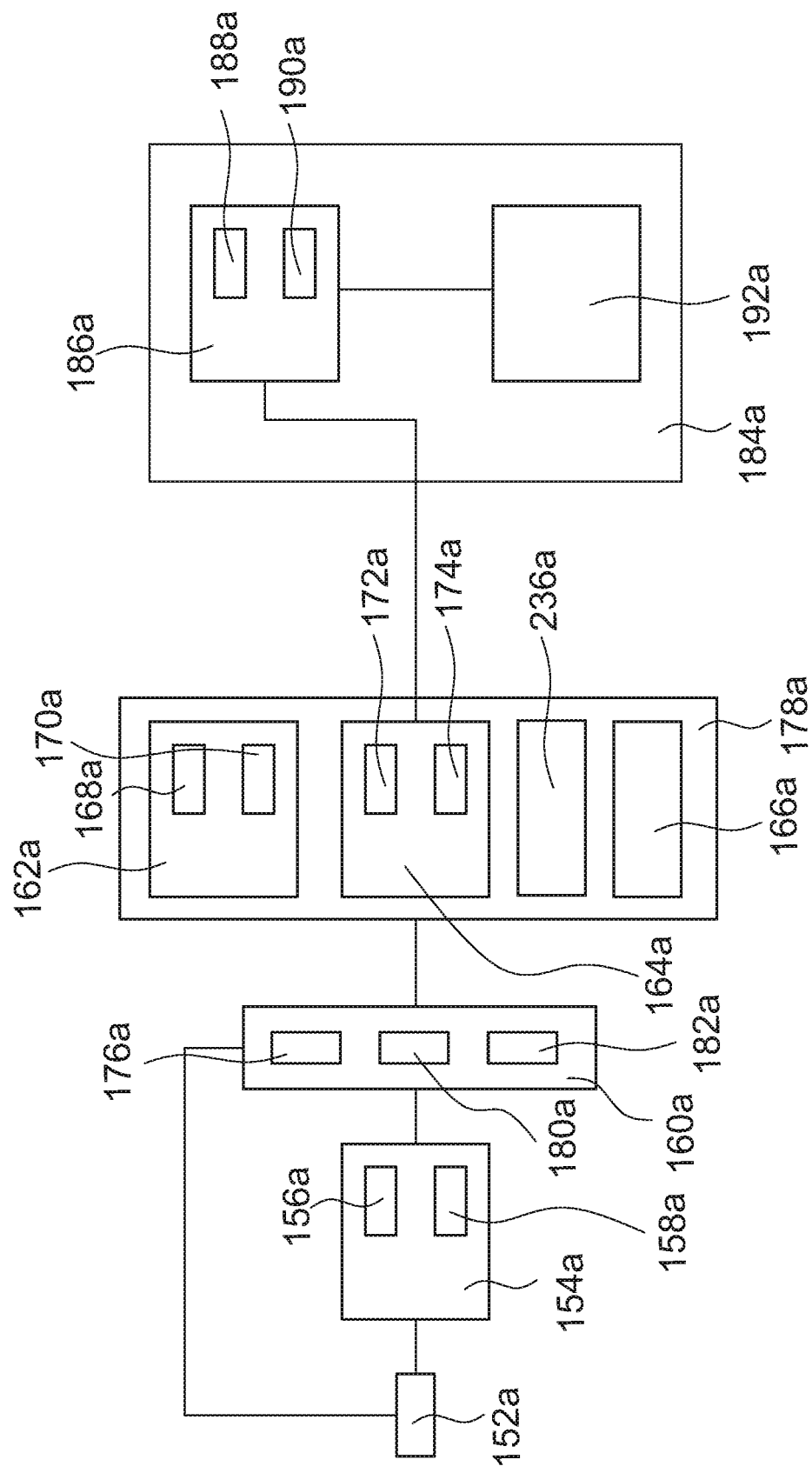
Figure 13:
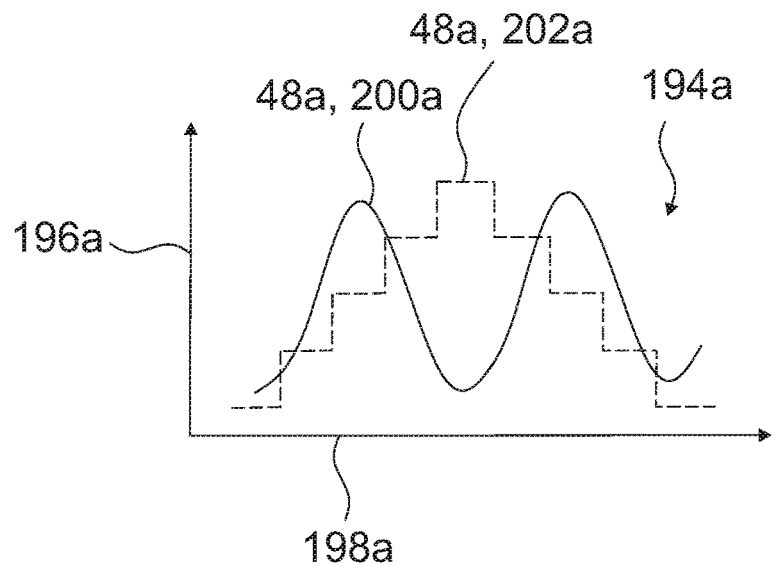
Figure 14:
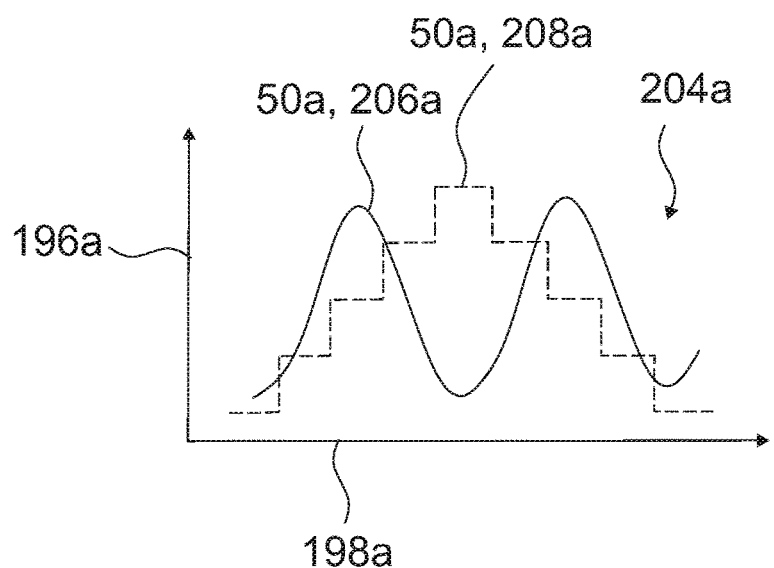
Figure 15:
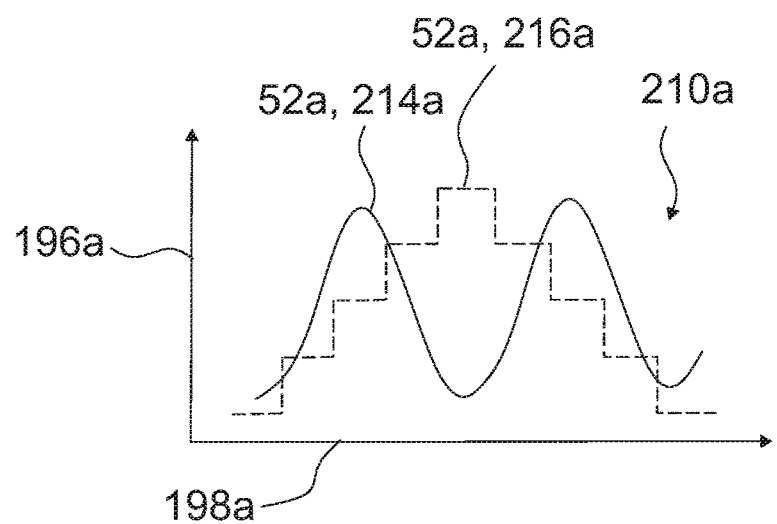
Figure 16:
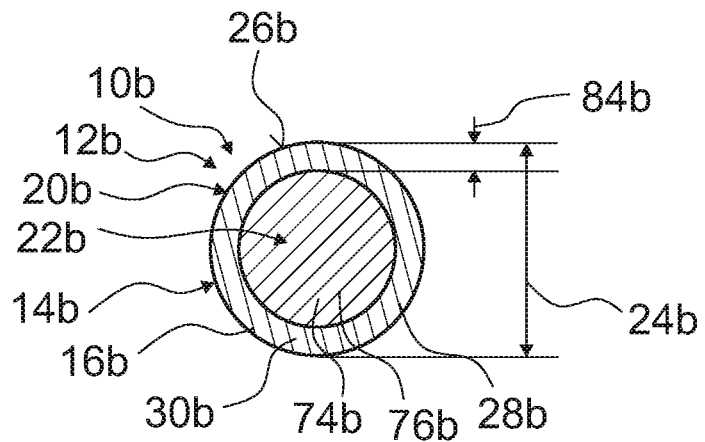
Figure 17:
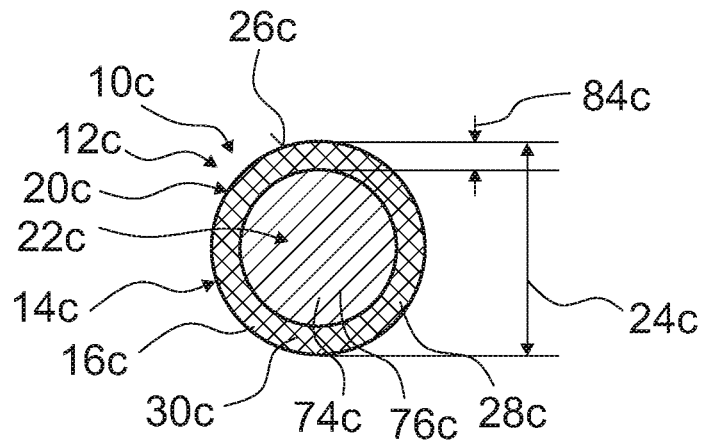
Figure 18:
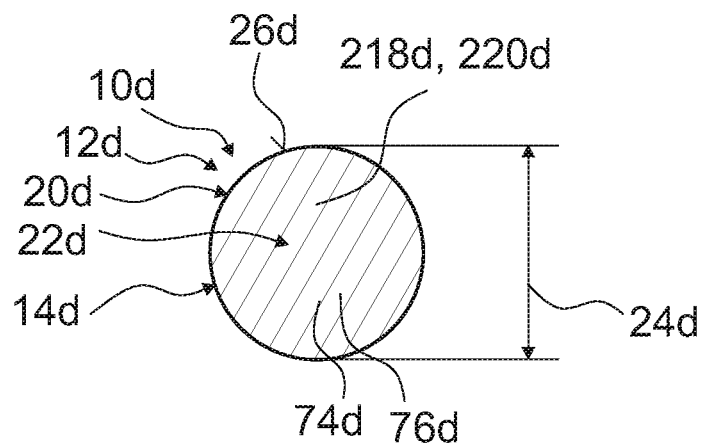
Figure 19:
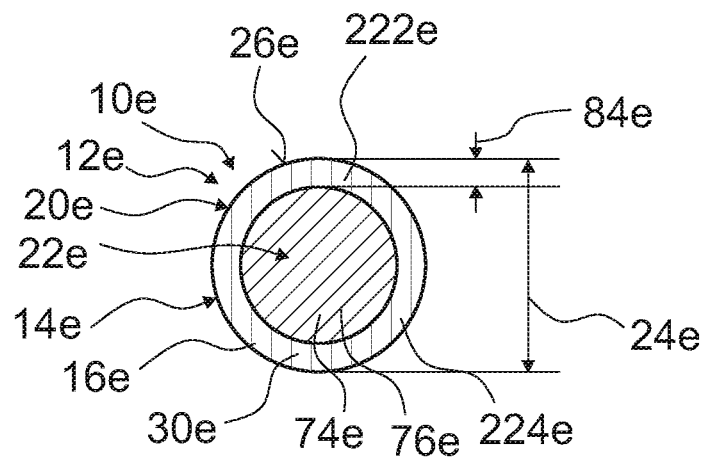
Figure 20:
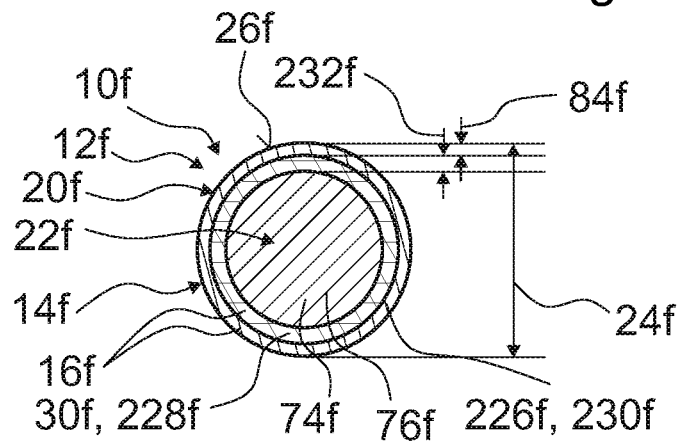
Figure 21:
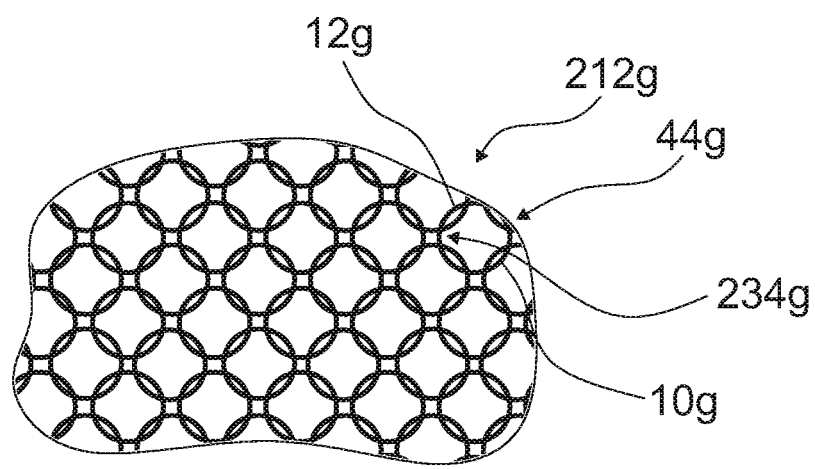

It is shown in:

FIG. 1 a schematic view of a portion of a wire net with a wire netting device,

FIG. 2a a sectional view of a wire of the wire netting device with a corrosion protection, FIG. 2b a sectional view of a further wire with a corrosion protection, FIG. 3 a schematic view of a bending unit, FIG. 4 a schematic view of a twisting unit, FIG. 5 a schematic view of a winding unit, FIG. 6 a schematic perspective view of a test chamber with a test device, FIG. 7 a schematic perspective view of a holding unit of the test device, FIG. 8 a temporal flow chart of an alternating climate test in the test chamber, FIG. 9 a temperature curve and a relative-humidity curve during a sub-cycle of the alternating climate test, FIG. 10 a temperature curve and a relative-humidity curve during a further sub-cycle of the alternating climate test, FIG. 11 a temperature curve and a relative-humidity curve during an additional further sub-cycle of the alternating climate test, FIG. 12 a flow chart of a method, FIG. 13 a temperature-time diagram, FIG. 14 a concentration-time diagram, FIG. 15 a concentration-time diagram, FIG. 16 a sectional view of a wire with an alternative corrosion protection, FIG. 17 a sectional view of a wire with a further alternative corrosion protection, FIG. 18 a sectional view of a wire with a second further alternative corrosion protection, FIG. 19 a sectional view of a wire with a third further alternative corrosion protection, FIG. 20 a sectional view of a wire with a fourth further alternative corrosion protection, and FIG. 21 a schematic view of a portion of a further wire net with the wire netting device.

DESCRIPTION OF THE ALTERNATIVE EMBODIMENTS

FIG. 1 shows a schematic view of a portion of a wire net 44a with a wire netting device. The wire net 44a is embodied as a safety net for a safeguarding from rockfall. The wire netting device is embodied as a safety net device. The wire netting device comprises a plurality of net elements 10a. The wire net 44a comprises a plurality of more than two mutually engaging net elements 10a. The net elements 10a respectively engage one into the other one. The net elements 10a are braided with one another. The net elements 10a form a wire mesh 18a. The net elements 10a are implemented to be helix-shaped. The net elements 10a are embodied as helices 58a. The net element 10a has a main extension direction 60a. By a "main extension direction" of an object is herein in particular a direction to be understood which extends parallel to a longest edge of a smallest geometrical rectangular cuboid just still enclosing the object completely. The main extension directions 60a of the net elements 10a are aligned in parallel to one another. The net element 10a has a shape of a flat-pressed helix. The net element 10a comprises a sequence of alternating legs 62a, 64a. The net element 10a comprises bending regions 66a. A bending region 66a connects two legs 62a, 64a. Mutually engaging net elements 10a are in contact with one another in a spread state in a proximity 68a of the bending regions 66a, preferably in the bending regions 66a. The legs 62a, 64a span a bending angle 70a. The legs 62a, 64a have a bending radius 46a. The bending radius 46a of different bending regions 66a of a net element 10a and/or of different net elements 10a is constant. The net element 10a comprises a single wire that is implemented of a wire 12a. Alternatively the net element 10a may comprise a wire bundle with the wire 12a, a wire strand with the wire 12a, a wire rope with the wire 12a and/or another longitudinal element with the wire 12a.

FIGS. 2a and 2b show cross sections 22a of the wire 12a that is implemented perpendicularly to an extension direction 72a of the wire 12a. The wire 12a has a circumference 20a. The wire 12a has a diameter 24a. In the exemplary embodiments shown in FIGS. 2a and 2b, the diameter 24a of the wire 12a is 4 mm. The wire 12a has a wire surface 26a. The wire 12a comprises a wire core 76a. The wire 12a comprises a corrosion protection 14a. The wire 12a comprises a coating 30a. The corrosion protection 14a is embodied as a coating 30a. The coating 30a is implemented as a corrosion protection layer 16a. Apart from the coating 30a, the wire 12a is implemented of a high-tensile steel 74a. The wire core 76a is implemented of a high-tensile steel 74a. In the exemplary embodiments shown in FIGS. 2a and 2b, the corrosion protection layer 16a has a mass per unit area of at least 300 g/m². The corrosion protection layer 16a completely encompasses the wire core 76a in a circumferential direction. The corrosion protection layer 16a has a constant layer thickness 84a. The corrosion protection layer 16a is realized as a zinc coating 80a. The corrosion protection layer 16a is connected with the wire core 76a via substance-to-substance bond. By "connected via substance-to-substance bond" is in particular to be understood that the mass particles are held together by atomic or molecular forces like, for example, with soldering, welding, gluing, zincking, galvanizing and/or vulcanizing.

FIG. 3 shows a schematic representation of a bending unit 86a for carrying out a reverse bend test of a wire 12a. The bending unit 86a comprises clamping jaws 88a, 90a, which are configured for a clamping-in of a test piece 92a of a wire 12a.

The test piece 92a is preferably a portion of the wire 12a and/or of the wire mesh 18a of the wire netting device. In the case shown it is a test piece 92a of the wire 12a. The bending unit 86a comprises a bending lever 94a, which is supported in such a way that it is pivotable back and forth. The bending lever 94a comprises drivers 96a, 98a for the test piece 92a of the wire 12a. The bending unit 86a comprises a bending cylinder 32a which the test piece 92a of the wire 12a is bent around in the reverse bend test. The bending unit 86a comprises a further bending cylinder 100a, which is implemented identically to the bending cylinder 32a. The further bending cylinder 100a is arranged opposite the bending cylinder 32a. In the reverse bend test the bending lever 94a bends the test piece 92a of the wire 12a by at least 90° alternatingly around the bending cylinder 32a and the further bending cylinder 100a. To test a load capacity and/or a flexibility of the coating 30a, in particular of the corrosion protection layer 16a, the reverse bend test is usually executed until the coating 30a, in particular the corrosion protection layer 16a, of the test piece 92a of the wire 12a is damaged, in particular breaks, bursts, tears and/or comes off. The coating 30a, in particular the corrosion protection layer 16a, of the wire 12a survives without damages at least M-fold back-and-forth bending of the wire 12a by at least 90° in opposite directions 36a, 38a around the bending cylinders 32a, 100a. The bending cylinders 32a, 100a have a diameter 34a of maximally 8d, wherein d is the diameter 24a of the wire 12a given in millimeters. The value M can be determined, if applicable with rounding-down, to be $C*R^{-0.5}*d^{-0.5}$. R constitutes a tensile strength of the wire 12a given in $N*mm^{-2}$. In the exemplary embodiment shown the tensile strength of the wire 12a is 1570 $N*mm^{-2}$. C constitutes a constant factor. In the exemplary embodiment shown C is 750 $N^{0.5}*mm^{0.5}$.

FIG. 4 shows a schematic representation of a twisting unit 102a for carrying out a twisting test of a wire 12a, The twisting unit 102a comprises a basic unit 112a, The twisting unit 102a comprises a twisting lever 104a, which is supported in such a way that it is rotatable around an axis 106a. The twisting unit 102a is convertible into the bending unit 86a and vice versa. When converting the bending unit 86a and/or the twisting unit 102a, the bending lever 94a and the twisting lever 104a are exchanged. The twisting unit 102a comprises clamping jaws 88a, 90a, which are configured for a clamping-in of a test piece 92a of a wire 12a in the basic unit 112a. The test piece 92a is preferably embodied as a portion of the wire 12a and/or of the wire mesh 18a of the wire netting device. In the case shown it is a test piece 92a of the wire 12a. The twisting lever 104a comprises clamping jaws 108a, 110a, which are configured for a clamping-in of a test piece 92a of a wire 12a in the twisting lever 104a. The twisting lever 104a is configured to twist the test piece 92a by means of a rotation of the twisting lever 104a around the axis 106a. In a rotation of the twisting lever 104a the basic unit 112a remains rotation-free. In the twisting test the twisting lever 104a twists the test piece 92a of the wire 12a by a multiple of 360° around an axis 106a that is parallel to a longitudinal extension of the test piece 92a. To test a load capacity and/or a flexibility of the coating 30a, the twisting test is usually executed until the coating 30a, in particular the corrosion protection layer 16a, of the test piece 92a of the wire 12a is damaged, in particular breaks, bursts, tears and/or comes off. The coating 30a, in particular the corrosion protection layer 16a, of the wire 12a survives without damages at least N-fold twisting of the wire 12a. The value N can be determined, if applicable with rounding-down, to be $B*R^{-0.5}*d^{-0.5}$. B constitutes a constant factor. In the exemplary embodiment shown, B is 960 $N^{0.5}*mm^{0.5}$.

FIG. 5 shows a schematic representation of a winding unit 114a for carrying out a winding test of a wire 12a. The winding unit 114a comprises a winding mandrel 40a. The winding mandrel 40a is configured to provide a winding surface 116a for a winding-up of a wire 12a. The winding mandrel 40a has a diameter 42a. The diameter 42a is an outer diameter 118a of the winding mandrel 40a and at least substantially corresponds to a diameter 24a of the wire 12a, It is conceivable that the winding mandrel 40a is implemented of a portion of the wire 12a, in particular a portion of the wire 12a that is not bent. In a winding test the wire 12a is wound at least once, preferably spiral-like, around the winding mandrel 40a by 360 degrees. The corrosion protection 14a, in particular the corrosion protection layer 16a, survives a winding of the wire 12a around the winding mandrel 40a without damages.

FIG. 6 shows a test device for a testing of a corrosion resistance of at least one test piece 92a of the wire 12a and/or of a test piece 92a of the wire net 44a. The test device comprises a test chamber 120a. The test chamber 120a is embodied as a box which is closed off on all sides. The test chamber 120a comprises an opening 124a that can be closed by a flap 122a. The opening 124a is configured for moving test pieces 92a into the test chamber 120a and/or out of the test chamber 120a. The test chamber 120a is configured to realize a test environment for an alternating climate test, for a salt spray fog test and/or for a sulfur dioxide test and/or to carry out an alternating climate test, a salt spray fog test and/or a sulfur dioxide test. The test device comprises a control and/or regulation unit 134a. By a "control and/or regulation unit" is in particular a unit with at least one controlling electronics component to be understood. By a "controlling electronics component" is in particular a unit to be understood that comprises a processor unit 136a and a memory unit 138a as well as an operation program stored in the memory unit 138a. The control and/or regulation unit 134a is at least configured for a controlling of the alternating climate test, the salt spray fog test and/or the sulfur dioxide test. The test device comprises a distributer unit 126a. The distributer unit 126a is arranged in an interior 130a of the test chamber 120a. The distributer unit 126a is configured to produce and/or distribute a salt spray fog in the test chamber 120a. Alternatively the distributer unit 126a is configured to generate a sulfur dioxide concentration for a sulfur dioxide test in the test chamber 120a and/or to distribute sulfur dioxide in the test chamber 120a. Alternatively or additionally the distributer unit 126a is configured to regulate, in particular to increase, to reduce and/or to keep constant a relative humidity in the interior 130a of the test chamber 120a. The distributer unit 126a comprises an infeed and/or outfeed conduit 132a. By way of the infeed and/or outfeed conduit 132a, a salt solution for a generation of the salt spray fog and/or a sulfur dioxide solution and/or a sulfur dioxide gas can be conveyed to the distributer unit 126a and/or to the test chamber 120a and/or away from the distributer unit 126a and/or the test chamber 120a. The distributer unit 126a is controllable and/or regulatable by means of the control and/or regulation unit 134a. The test device comprises a heating and/or cooling unit 128a. The heating and/or cooling unit 128a is configured for a tempering of the interior 130a of the test chamber 120a. The heating and/or cooling unit 128a is configured for a controlled heating and/or cooling of the interior 130a of the test chamber 120a, The heating and/or cooling unit 128a is arranged at least partially in the interior 130a of the test chamber 120a. The heating and/or cooling unit 128a is arranged at least partially inside a wall 140a of the test chamber 120a. The heating and/or cooling unit 128a is controllable and/or regulatable by means of the control and/or regulation unit 134a, The test device comprises a holding unit 54a (cf, FIG. 7). The holding unit 54a is configured for a holding of at least one test piece 92a of the wire 12a and/or of the wire mesh 18a that is implemented of the wire 12a. The holding unit 54a is configured for a holding of a reference wire 56a and/or of a reference wire mesh. Test pieces 92a which are positioned in the holding unit 54a are alignable parallel to one another. Test pieces 92a which are positioned in the holding unit 54a are arranged in such a way that the test pieces 92a provide at least substantially identical impact surfaces for corrosive environment conditions in the test chamber 120a. The holding unit 54a is implemented of a corrosion-resistant material, for example a synthetic material. The holding unit 54a comprises receptacles 150a for receiving test pieces 92a and/or reference wires 56a. The test pieces 92a and/or reference wires 56a are clickable into the receptacles 150a. The test device comprises a mounting unit 142a. The mounting unit 142a is configured for a positioning of the holding unit 54a in the test chamber 120a, in particular in accordance with the requirements of the standard DIN EN ISO 9227:2006. The mounting unit 142a retains the holding unit 54a at an angle 144a of 20° relative to the vertical. The test device comprises a corrosion measuring unit 146a. The corrosion measuring unit 146a is configured to measure a progress and/or status of corrosion. The corrosion measuring unit 146a determines the status and/or progress of corrosion by an optical method, in particular by means of a camera 148a of the corrosion measuring unit 146a.

The wire 12a, in particular the wire mesh 18a implemented of the wire 12a, with the corrosion protection 14a, in particular the corrosion protection layer 16a, presents in a test run by an alternating climate test a corrosion resistance of more than 1,680 hours. The wire 12a, in particular the wire mesh 18a implemented of the wire 12a, with the corrosion protection 14a, in particular the corrosion protection layer 16a, further presents, in the test run by the alternating climate test, a corrosion resistance that is greater than a corrosion resistance of a further wire 78a.

The further wire 78a is implemented as a reference wire 56a. The further wire 78a has a circumference 20a that is at least substantially identical to the circumference 20a of the wire 12a. The further wire 78a has a cross section 22a that is at least substantially identical to the cross section 22a of the wire 12a. The further wire 78a has a diameter 24a that is at least substantially identical to the diameter 24a of the wire 12a. The further wire 78a comprises a wire surface 82a. The further wire 78a comprises a zinc coating 80a. The zinc coating 80a has a mass per unit area of at least 115 g/m². The zinc coating 80a has a mass per unit area of maximally 215 g/m². The further wire 78a meets at least the requirements for a class B wire according to the standard DIN EN 10264-2:2012-03. A wire mesh formed at least substantially identical to the wire mesh 18a can be produced from the further wire 78a.

FIG. 8 shows a temporal flow chart of the alternating climate test. The alternating climate test comprises a test cycle 256a. The test cycle 256a is divided into test sub-cycles. The sub-cycles comprise a cycle A 238a, a cycle B 240a and a cycle C 242a. The time sequence of the sub-cycles in the test cycle 256a is illustrated in FIG. 8 by a time axis 254a. The duration of one sub-cycle is one day. The duration of the test cycle 256a is one week.

FIGS. 9, 10 and 11 show temperature curves 246a of the test chamber temperature 48a as well as relative humidity curves 244a of the relative air humidity of the test chamber 120a during the cycle A 238a (FIG. 10), cycle B 240a (FIG. 11) and cycle C 242a (FIG. 9). The test chamber temperature 48a is plotted on ordinates 196a on the lefthand sides of the diagrams. The relative air humidity is plotted on further ordinates 248a on the righthand sides of the diagrams. Abscissae 198a show a time given in hours.

The cycle A 238a (cf. FIG. 10) starts with a three-hour salt spray phase 250a. During the salt spray phase 250a the test chamber 120a is filled with a salt spray fog by means of the distributer unit 126a. During the salt spray phase 250a the test chamber temperature 48a is 35° C. Following the salt spray phase 250a the test chamber temperature 48a is raised from 35° C. to 50° C. within two hours and is maintained at this value for further 15 hours. Then the test chamber temperature 48a sinks to 35° C. within four hours. After the salt spray phase 250a, the relative air humidity is reduced from 100% to 50% within six hours and then increases step-wise to 95% within eight hours. The relative air humidity keeps the value of 95% until the cycle A 238a ends after further five hours.

The cycle B 240a (cf. FIG. 11) starts with a three-hour decrease of the test chamber temperature 48a from 35° C. to 25° C. and is maintained at this value for further three hours. Then the test chamber temperature 48a increases to 50° C. within five hours. After further nine hours at this value, the test chamber temperature 48a sinks to 35° C. within four hours, until the end of cycle B 240a. The relative air humidity decreases at the beginning from 95% to 70% within three hours and keeps this value for ten hours. After that, the relative air humidity increases step-wise to 95% during six hours. The relative air humidity stays at the value of 95% until the cycle B 240a ends after further five hours.

The cycle C 242a (cf. FIG. 9) starts with a four-hour decrease of the test chamber temperature 48a from 35° C. to −15° C. and is held at this value for further five hours. During these five hours the test chamber temperature 48a is below freezing point.

The test chamber 120a is in a freezing phase 252a. Following the freezing phase 252a, the test chamber temperature 48a is raised to 50° C. within five hours. After further six hours at this value, the test chamber temperature 48a decreases to 35° C. within four hours, until the end of the cycle 242a, The relative air humidity decreases at the beginning, starting from 95%. In the freezing phase 252a the relative air humidity is very low. When the freezing phase 252a has ended and the test chamber temperature 48a has risen above freezing point, the relative air humidity stays at 70% for three hours. Then the relative air humidity increases step-wise to 95% during five hours. The relative air humidity stays at the value of 95% for further five hours, until the cycle 242a ends.

The wire 12a, in particular the wire mesh 18a implemented of the wire 12a, with the corrosion protection 14a, in particular the corrosion protection layer 16a, in a test run by a salt spray fog test has a corrosion resistance of more than 500 hours. Moreover, the wire 12a, in particular the wire mesh 18a that is implemented of the wire 12a, with the corrosion protection 14a, in particular the corrosion protection layer 16a, in the test run by the salt spray fog test has a corrosion resistance that is higher than a corrosion resistance of a further wire 78a.

Furthermore, the wire 12a with the corrosion protection 14a, in particular the wire mesh 18a implemented of the wire 12a, with the corrosion protection 14a, in particular the corrosion protection layer 16a, in an additional test run by a sulfur dioxide test has a corrosion resistance of more than 500 hours. The wire 12a, in particular a wire mesh 18a that is implemented of the wire 12a, with the corrosion protection 14a, in particular the corrosion protection layer 16a, in the additional test run by the sulfur dioxide test has a corrosion resistance that is higher than a corrosion resistance of the further wire 78a.

The wire 12a, in particular the wire mesh 18a implemented of the wire 12a, with the corrosion protection 14a, in particular the corrosion protection layer 16a, presents in an exposition test, within a defined time interval, substantially less corrosion than the further wire 78a subjected to the same exposition test at the same time. It is possible to estimate the corrosion, in particular the corrosion intensity, of a wire 12a, 78a on the basis of a number and/or a total area of corroded places on a wire surface 26a, 82a of a wire 12a, 78a. In the exposition test, test pieces 92a of wires 12a and/or of wire meshes 18a are positioned, in particular exposed, in at least one mounting position, preferably at least two mounting positions differing from one another, in particular a vertical mounting position and/or a horizontal mounting position and/or an inclined mounting position.

FIG. 12 shows a flow chart for methods for a production of a wire netting device and/or of a wire net 44a, for an identification of a suitable wire 12a and/or for a test method for testing a corrosion resistance. In at least one method step 152a the wire is produced from the high-tensile steel 74a. In at least one method step 154a the wire 12a is coated with the coating 30a. In at least one method step 156a the wire 12a is coated, in the coating process, at a coating temperature which remains below 430° C. in every work step. In at least one method step 158a a heat acting onto the wire 12a during the coating of the wire 12a is used to generate an increase of the tensile strength of the wire 12a.

In at least one method step 160a a wire 12a having a corrosion protection 14a and/or a corrosion protection layer 16a is selected for a testing of its corrosion resistance. In at least one method step 176a a selection of the wire 12a for a testing of its corrosion resistance is made dependent on a test of the corrosion protection layer 16a by way of a winding test. Wires 12a with corrosion protection layers 16a which fail the winding test are discarded. In at least one method step 180a a selection of the wire 12a for a testing of its corrosion resistance is made dependent on a test of the corrosion protection layer 16a by way of a twisting test. Wires 12a with corrosion protection layers 16a which fail the twisting test are discarded. In at least one method step 182a a selection of the wire 12a for the testing of its corrosion resistance is made dependent on a test of the corrosion protection layer 16a by way of a reverse bend test. Wires 12a with corrosion protection layers 16a that fail in the reverse bend test are discarded.

In at least one method step 178a a suitable wire 12a is identified for the wire netting device and/or for the wire net 44a having a high corrosion resistance. Herein the corrosion resistance of a test piece 92a of the wire 12a and/or of the wire mesh 18a is determined in at least one method step 236a by means of the alternating climate test, in at least one method step 164a by means of the salt spray fog test, in at least one method step 162a by means of the sulfur dioxide test and/or in at least one method step 166a by means of the exposition test.

In at least one method step 172a a test chamber temperature 48a is varied during the salt spray fog test (cf. FIG. 13). In the temperature-time diagram 194a given in FIG. 13 two temperature profiles 200a, 202a are shown. The temperature is here plotted on the ordinate 196a and the time is plotted on the abscissa 198a. A temperature profile 200a shows a sine-shaped course. A further temperature profile 202a shows a stepped-pyramid course. In at least one method step 174a a salt concentration 50a is varied during the salt spray fog test (cf. FIG. 14). In the concentration-time diagram 204a given in FIG. 14 two concentration profiles 206a, 208a are shown. The concentration is here plotted on the ordinate 196a and the time is plotted on the abscissa 198a. A concentration profile 206a shows a sine-shaped course. A further concentration profile 208a shows a stepped-pyramid course.

In at least one method step 168a a test chamber temperature 48a is varied during the sulfur dioxide test (cf. FIG. 13). In at least one method step 170a a sulfur dioxide concentration 52a is varied during the sulfur dioxide test (cf, FIG. 15). In the concentration-time diagram 210a given in FIG. 15 two concentration profiles 214a, 216a are shown. The concentration is herein plotted on the ordinate 196a and the time is plotted on the abscissa 198a. A concentration profile 214a shows a sine-shaped course. A further concentration profile 216a shows a stepped-pyramid course.

In at least one method step 184a a wire net 44a is produced from wire netting devices. In at least one method step 186a a wire 12a implemented of a high-tensile steel 74a is bent into helices 58a and/or into net elements 10a which are closed in themselves in a ring-shaped manner (cf. FIG. 21). To form a net element 10a, the wire 12a is bent in at least one method step 188a with a bending radius 46a that is in every work step greater than 5 mm. To form a net element 10a, the wire 12a is bent with a bending speed that is below 360 degrees per second in at least one method step 190a. In at least one method step 192a at least one wire net 44a is braided from the helices 58a and/or the net elements 10a that are closed in themselves.

Six further exemplary embodiments of the invention are shown in FIGS. 16 to 21. The following descriptions and the drawings are essentially limited to the differences between the exemplary embodiments, wherein regarding structural components given the same denomination, in particular regarding structural components having the same reference numerals, principally the drawings and/or the description of the other exemplary embodiments, in particular of FIGS. 1 to 15, may be referred to. In order to distinguish between the exemplary embodiments, the letter a has been added to the reference numerals of the exemplary embodiment of FIGS. 1 to 15. In the exemplary embodiments of FIGS. 16 to 21 the letter a has been substituted by the letters b to g.

FIG. 16 shows a cross section 22b of a wire 12b of a wire netting device, which cross section 22b is implemented perpendicularly to an extension direction 72b of the wire 12b. The wire 12b comprises a wire core 76b. The wire 12b comprises a corrosion protection 14b. The wire 12b comprises a coating 30b. The corrosion protection 14b is embodied as a coating 30b. The coating 30b is embodied as a corrosion protection layer 16b. Apart from the coating 30b, the wire 12b is implemented of a high-tensile steel 74b. The wire core 76b is implemented of a high-tensile steel 74b. The corrosion protection layer 16b completely encompasses the wire core 76b in a circumferential direction. The corrosion protection layer 16b has a constant layer thickness 84b. The corrosion protection layer 16b is embodied as a zinc-aluminum coating 28b. The zinc-aluminum coating 28b comprises an aluminum fraction of approximately 5%. The corrosion protection layer 16b is connected with the wire core 76b by substance-to-substance bond.

FIG. 17 shows a cross section 22c of a wire 12c of a wire netting device, which cross section 22c is implemented perpendicularly to an extension direction 72c of the wire 12c. The wire 12c comprises a wire core 76c. The wire 12c comprises a corrosion protection 14c. The wire 12c comprises a coating 30c. The corrosion protection 14c is embodied as a coating 30c. The coating 30c is embodied as a corrosion protection layer 16c. Apart from the coating 30c, the wire 12c is implemented of a high-tensile steel 74c. The wire core 76c is implemented of a high-tensile steel 74c. The corrosion protection layer 16c completely encompasses the wire core 76c in a circumferential direction. The corrosion protection layer 16c has a constant layer thickness 84c. The corrosion protection layer 16c is embodied as a zinc-aluminum coating 28c. The zinc-aluminum coating 28c comprises an aluminum fraction of approximately 5%. The zinc-aluminum coating 28c comprises at least one additive that is different from aluminum and/or from zinc. The additive is realized as magnesium. The additive comprises at least 0.5% of the corrosion protection layer 16c. The corrosion protection layer 16c is connected with the wire core 76c by substance-to-substance bond.

FIG. 18 shows a cross section 22d of a wire 12d of a wire netting device, which cross section 22d is implemented perpendicularly to an extension direction 72d of the wire 12d. The wire 12d comprises a wire core 76d. The wire 12d comprises a corrosion protection 14d. The corrosion protection 14d is embodied integrally with the wire 12d. The wire 12d is implemented of a high-tensile steel 74d. The corrosion protection 14d is implemented of a high-tensile steel 74d. The wire 12d is implemented of a stainless steel 218d and/or a stain-resistant steel 220d. The corrosion protection 14d is implemented of a stainless steel 218d and/or a stain-resistant steel 220d. The wire core 76d is embodied of a high-tensile steel 74d.

FIG. 19 shows a cross section 22e of a wire 12e of a wire netting device, which cross section 22e is implemented perpendicularly to an extension direction 72e of the wire 12e, The wire 12e comprises a wire core 76e. The wire 12e comprises a corrosion protection 14e. The wire 12e comprises a coating 30e. The corrosion protection 14e is implemented as a coating 30e, The coating 30e is implemented as a corrosion protection layer 16e. Apart from the coating 30e, the wire 12e is implemented of a high-tensile steel 74e. The wire core 76e is implemented of a high-tensile steel 74e. The corrosion protection layer 16e completely encompasses the wire core 76e in a circumferential direction. The corrosion protection layer 16e has a constant layer thickness 84e. The corrosion protection layer 16e is to a large extent embodied of an at least partly organic and/or at least partly inorganic carbon compound. The corrosion protection layer 16e is embodied at least partially as a synthetic coating 222e. The corrosion protection layer 16e is implemented at least partly of a graphene coating 224e, The corrosion protection layer 16e is connected with the wire core 76e by substance-to-substance bond.

FIG. 20 shows a cross section 22f of a wire 12f of a wire netting device, which cross section 22f is implemented perpendicularly to an extension direction 72f of the wire 12f. The wire 12f comprises a wire core 76f. The wire 12f comprises a corrosion protection 14f. The wire 12f comprises a plurality of coatings 30f, 226f. The wire 12f comprises two coatings 30f, 226f, wherein one coating 30f is embodied as an inner coating 228f and another coating 226f is embodied as an outer coating 230f. The inner coating 228f and the outer coating 230f are implemented of at least substantially different coating materials. The outer coating 230f completely encompasses the inner coating 228f at least in a circumferential direction. The corrosion protection 14f is embodied as a plurality of coatings 30f, 226f. The coatings 30f, 226f are embodied as two corrosion protection layers 16f. Apart from the coatings 30f, 226f, the wire 12f is implemented of a high-tensile steel 74f. The wire core 76f is implemented of a high-tensile steel 74f. The corrosion protection layers 16f completely encompass the wire core 76f in a circumferential direction. The corrosion protection layers 16f have constant layer thicknesses 84f, 232f. The corrosion protection layers 16f may have different and/or identical layer thicknesses 84f, 232f. The inner coating 228f is connected with the wire core 76f by substance-to-substance bond. The outer coating 230f is connected with the inner coating 228f by substance-to-substance bond.

FIG. 17 shows a wire net 44g. The wire net 44g is implemented as a safety net for a safeguarding against rockfall. The wire net 44g comprises a wire netting device. The wire netting device comprises a plurality exceeding two of mutually engaging net elements 10g. The net elements 10g are implemented of a high-tensile steel 74g. The net elements 10g are implemented in such a way that they are closed in themselves in a ring-shaped manner. The wire net 44g is embodied as a ring net 212g. The net elements 10g are embodied as ring elements 234g of the ring net 212g.

REFERENCE NUMERALS 10 net element
12 wire
14 corrosion protection
16 corrosion protection layer
18 wire netting
20 circumference
22 cross section
24 diameter
26 wire surface
28 zinc-aluminum coating
30 coating
32 bending cylinder
34 diameter
36 direction
38 direction
40 winding mandrel
42 diameter
44 wire net
46 bending radius
48 test chamber temperature
50 salt concentration
52 sulfur dioxide concentration
54 holding unit
56 reference wire
58 helix
60 main extension direction
62 leg
64 leg
66 bending region
68 proximity
70 bending angle
72 extension direction
74 high-tensile steel
76 wire core
78 further wire
80 zinc coating
82 wire surface
84 layer thickness
86 bending unit
88 clamping jaw
90 clamping jaw
92 test piece
94 bending lever
96 driver
98 driver 100 bending cylinder
102 twisting unit
104 twisting lever
106 axis
108 clamping jaw
110 clamping jaw
112 basic unit
114 winding unit
116 winding surface
118 outer diameter
120 test chamber
122 flap
124 opening
126 distributer unit
128 heating and/or cooling unit
130 interior
132 infeed and/or outfeed conduit
134 control and/or regulation unit
136 processor unit
138 memory unit
140 wall
142 mounting unit
144 angle
146 corrosion measuring unit
148 camera
150 receptacle
152 method step
154 method step
156 method step
158 method step
160 method step
162 method step
164 method step
166 method step
168 method step
170 method step
172 method step
174 method step
176 method step
178 method step
180 method step
182 method step
184 method step
186 method step
188 method step
190 method step
192 method step
194 temperature-time diagram
196 ordinate
198 abscissa
200 temperature profile
202 further temperature profile
204 concentration-time diagram
206 concentration profile
208 further concentration profile
210 concentration-time diagram
212 ring net
214 concentration profile
216 further concentration profile
218 stainless steel
220 stain-resistant steel
222 synthetic coating
224 graphene coating
226 coating
228 inner coating
230 outer coating
232 layer thickness
234 ring element
238 cycle A
240 cycle B
242 cycle C
244 relative humidity curve
246 temperature curve
248 further ordinate
250 salt spray phase
252 freezing phase
254 time axis
256 test cycle

The invention claimed is:
1. A wire netting device comprising
at least two mutually engaging net elements, each of the at least two mutually engaging net elements being produced from a longitudinal element having a wire that is made at least partially of a high-tensile steel,
wherein the at least two net elements each present a shape of a flat-pressed helix with a sequence of alternating legs and bending regions,
wherein each of the bending regions of the at least two net elements connects two of the alternating legs,
wherein a bending angle is spanned between associated two alternating legs of each of the bending regions,
wherein the wire comprises at least one corrosion protection layer that is embodied as a zinc-aluminum coating and that fulfills the requirements given in the standard DIN EN 10264-2:2012-3 for a minimum quantity of a coating for class A wires,
wherein at least a portion of the wire netting device having at least two of the bending regions in an alternating climate test has a corrosion resistance of more than 2520 hours,
wherein the alternating climate test is a corrosion resistance test of the corrosion protection following the VDA (German Association of the Automotive Industry) Recommendation VDA 233-102, according to which the alternating climate test is carried out in a test chamber, with the conditions in an interior of the test chamber during the alternating climate test being controlled and following specifications regarding temperature profiles, relative air humidity and periods of fogging with salt spray fog,
wherein a one week test cycle of the alternating climate test is divided into seven one day-long cycle sections,
wherein the one week test cycle comprises three different test sub-cycles each implementing one of the day-long cycle sections,
wherein the three test sub-cycles comprise a cycle A, a cycle B, and a cycle C,
wherein during the one week test cycle, the test sub-cycles are realized one by one as the day-long cycle section in the following order: cycle B, cycle A, cycle C, cycle A, cycle B, cycle B, cycle A,
wherein cycle A comprises a salt spray phase in which a salt spray fog is sprayed within the test chamber, with a salt solution sprayed during cycle A being realized as a solution of sodium chloride in distilled water, which has been boiled prior to a preparation of the solution and which has an electrical conductivity of maximally 20 µS/cm at $(25\pm2)°$ C., with a mass concentration in a range of $(10\pm1)$ g/l, wherein a temperature during cycle A is (35±0.5°)° C. during the spraying of the salt spray fog, wherein cycle B comprises a work phase, during which the temperature is maintained at room temperature of 25° C. and the relative humidity is maintained at a room-typical relative humidity of 70%, wherein cycle C comprises a freezing phase, in which the test chamber temperature is maintained at a value below 0° C., and wherein the corrosion resistance indicates a time interval which passes until dark brown rust (DBR) is visually perceivable on at least 5% of an overall surface of the portion of the wire netting implemented of the wire that is exposed to the alternating climate test.

2. The wire netting device according to claim 1, wherein the zinc-aluminum coating comprises approximately 5% aluminum.

3. The wire netting device according to claim 2, wherein the zinc-aluminum coating comprises at least one additive, being implemented as magnesium, which comprises at least 0.5% of the corrosion protection layer.

4. A wire net that is embodied as one of:
a slope stabilization,
a safety fence,
a catch fence,
a rockfall-protection net,
a barrier fence,
a fish-farming net,
a predator-protection net,
an enclosure fence,
a tunnel securing,
a landslide barrier,
a motorsport debris fence,
a road fence,
an avalanche protection,
a covering of buildings,
an envelope of buildings,
an explosion protection,
a projectile protection,
a shield against flying objects, and
a ram protection, the wire net comprising
a plurality of the wire netting device according to claim 1.

* * * * *